United States Patent
Xian et al.

(10) Patent No.: US 11,699,015 B2
(45) Date of Patent: Jul. 11, 2023

(54) CIRCUIT ARRANGEMENTS HAVING REDUCED DEPENDENCY ON LAYOUT ENVIRONMENT

(71) Applicants: TAIWAN SEMICONDUCTOR MANUFACTURING COMPANY, LTD., Hsinchu (TW); TSMC CHINA COMPANY, LIMITED, Shanghai (CN); TSMC NANJING COMPANY, LIMITED, Jiangsu (CN)

(72) Inventors: Huaixin Xian, Hsinchu (TW); J. B. Zhang, Hsinchu (TW); Yang Zhou, Hsinchu (TW); Kai Zhou, Hsinchu (TW); Qingchao Meng, Hsinchu (TW); Lei Pan, Hsinchu (TW)

(73) Assignees: TAIWAN SEMICONDUCTOR MANUFACTURING COMPANY, LTD., Hsinchu (TW); TSMC NANJING COMPANY, LIMITED, Nanjing (CN); TSMC CHINA COMPANY, LIMITED, Shanghai (CN)

( * ) Notice: Subject to any disclaimer, the term of this patent is extended or adjusted under 35 U.S.C. 154(b) by 149 days.

(21) Appl. No.: 17/393,188

(22) Filed: Aug. 3, 2021

(65) Prior Publication Data

US 2023/0004702 A1    Jan. 5, 2023

(30) Foreign Application Priority Data

Jul. 2, 2021 (CN) .......................... 202110752564.0

(51) Int. Cl.
| | | |
|---|---|---|
| *G06F 30/00* | (2020.01) | |
| *G06F 30/392* | (2020.01) | |
| *G06F 30/30* | (2020.01) | |
| *G06F 119/18* | (2020.01) | |

(52) U.S. Cl.
CPC ............ *G06F 30/392* (2020.01); *G06F 30/30* (2020.01); *G06F 2119/18* (2020.01)

(58) Field of Classification Search
CPC ..... G06F 30/392; G06F 30/30; G06F 2119/18
See application file for complete search history.

(56) References Cited

U.S. PATENT DOCUMENTS

| | | | |
|---|---|---|---|
| 7,260,442 B2 | 8/2007 | Hwang et al. | |
| 9,256,709 B2 | 2/2016 | Yu et al. | |
| 10,846,458 B2* | 11/2020 | Chen | ................... G06F 30/3953 |
| 11,282,829 B2* | 3/2022 | Sio | ....................... H01L 27/0924 |

(Continued)

*Primary Examiner* — Naum Levin
(74) *Attorney, Agent, or Firm* — Hauptman Ham, LLP

(57) ABSTRACT

An integrated circuit includes a middle active-region structure between a group-one active-region structure and a group-two active-region structure. The integrated circuit also includes a main circuit, a group-one circuit, and a group-two circuit. The main circuit includes at least one boundary gate-conductor intersecting the middle active-region structure. The group-one circuit includes a group-one isolation structure separating the group-one active-region structure into a first part in the group-one circuit and a second part in a first adjacent circuit. The group-two circuit includes a group-two isolation structure separating the group-two active-region structure into a first part in the group-two circuit and a second part in a second adjacent circuit.

20 Claims, 24 Drawing Sheets

(56) References Cited

U.S. PATENT DOCUMENTS

| | | | |
|---|---|---|---|
| 11,587,926 B2* | 2/2023 | Liaw | H01L 23/5226 |
| 2014/0040838 A1 | 2/2014 | Liu et al. | |
| 2015/0278429 A1 | 10/2015 | Chang | |
| 2022/0246601 A1* | 8/2022 | Baek | H01L 29/0673 |
| 2022/0254770 A1* | 8/2022 | Lai | G06F 30/39 |
| 2022/0327275 A1* | 10/2022 | Liu | H03K 17/693 |

* cited by examiner

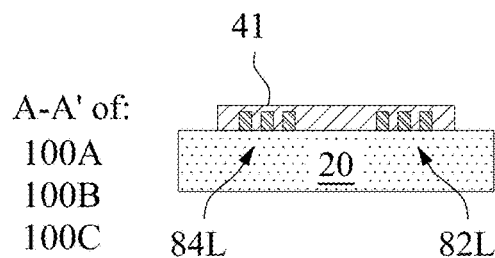
FIG. 3A
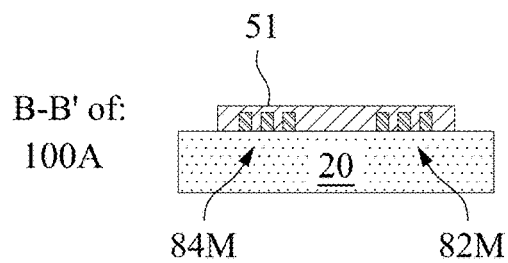
FIG. 3B
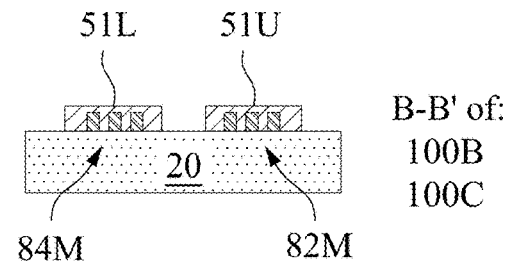
FIG. 3B(a)
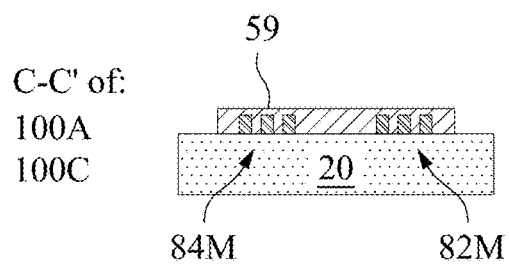
FIG. 3C
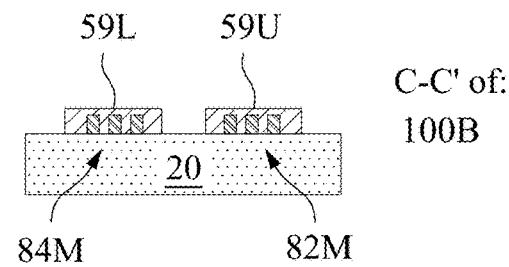
FIG. 3C(a)
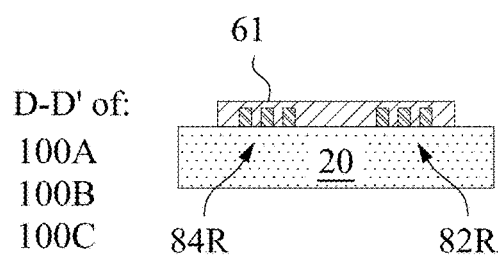
FIG. 3D
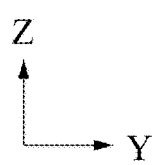

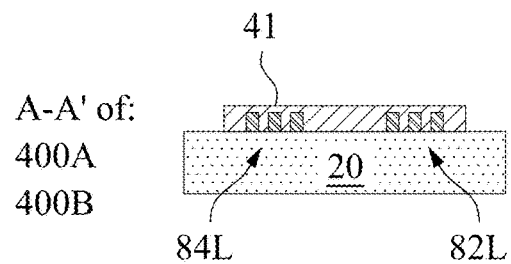
FIG. 5A
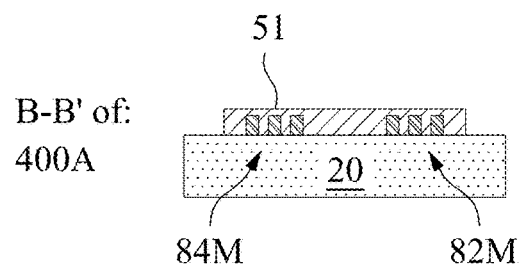
FIG. 5B
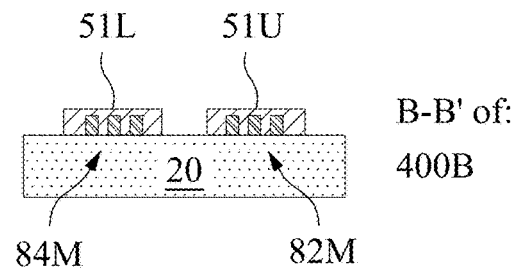
FIG. 5B(a)
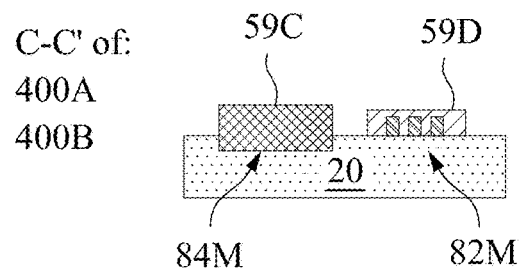
FIG. 5C
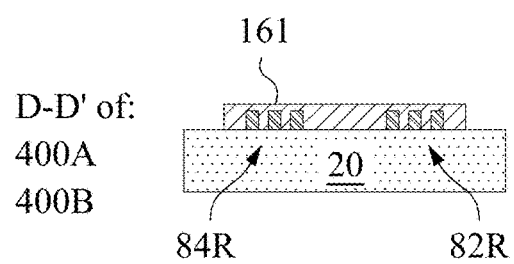
FIG. 5D
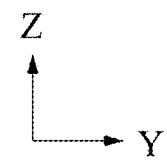

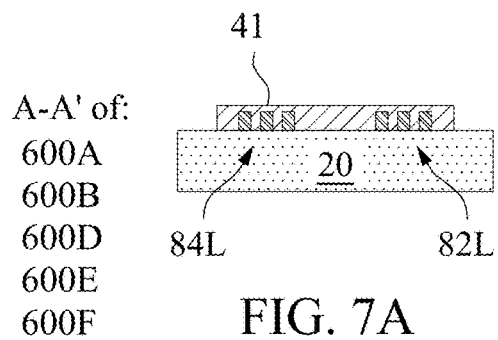
FIG. 7A
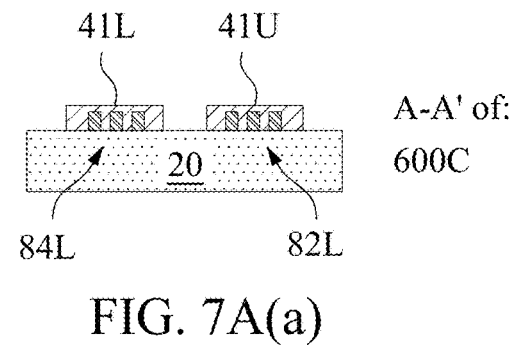
FIG. 7A(a)
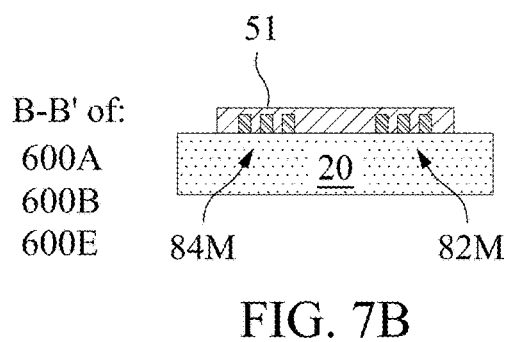
FIG. 7B
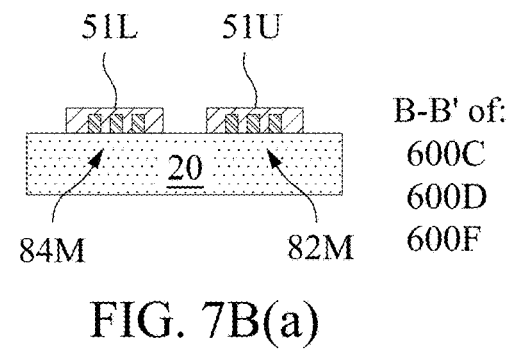
FIG. 7B(a)
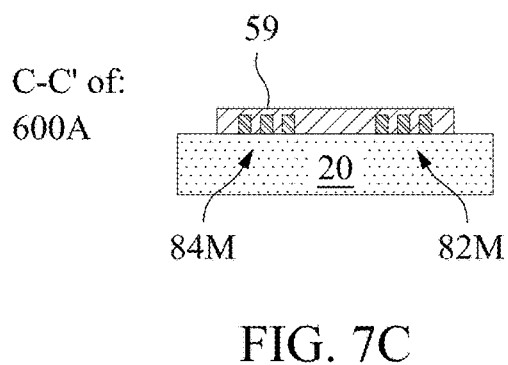
FIG. 7C
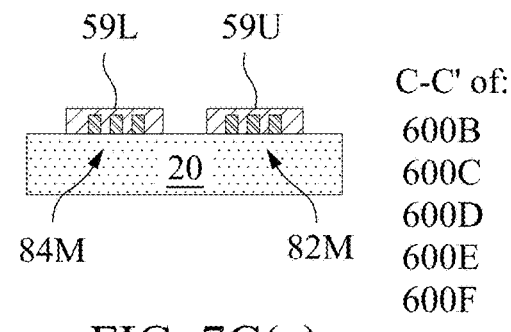
FIG. 7C(a)
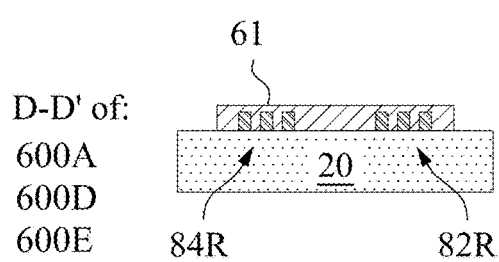
FIG. 7D
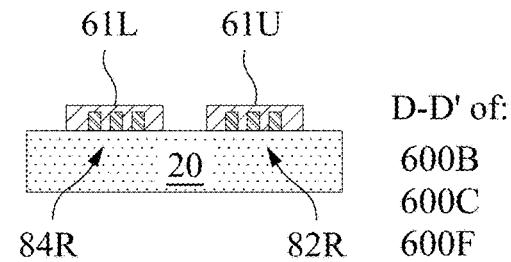
FIG. 7D(a)
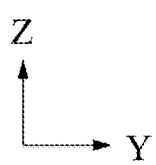

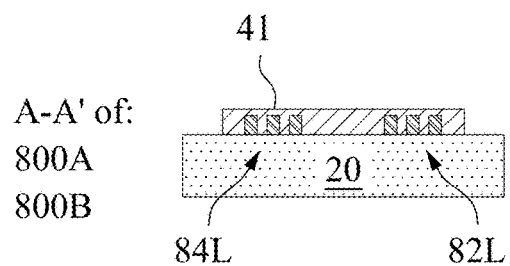
FIG. 9A
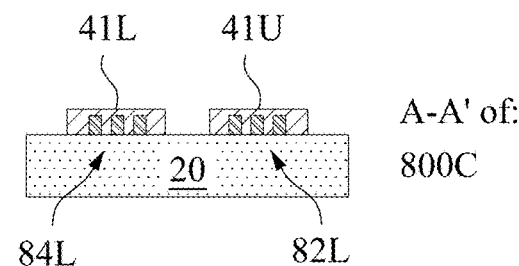
FIG. 9A(a)
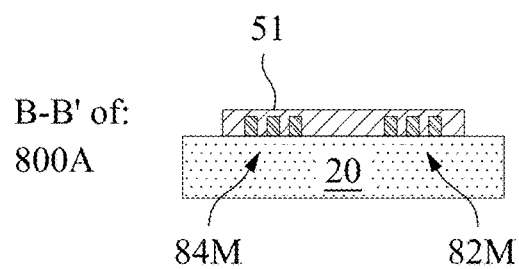
FIG. 9B
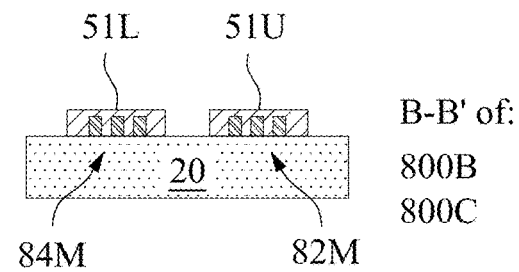
FIG. 9B(a)
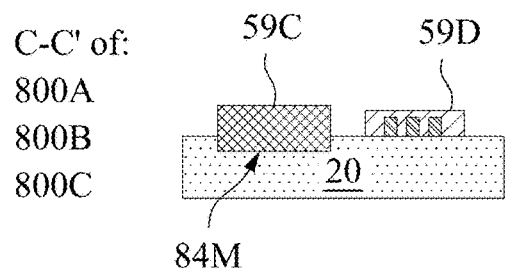
FIG. 9C
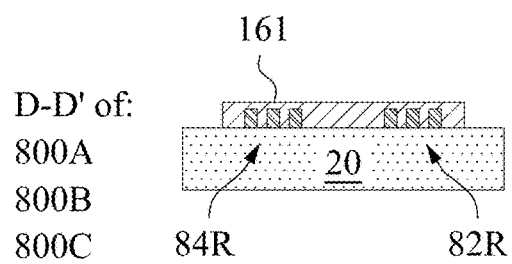
FIG. 9D
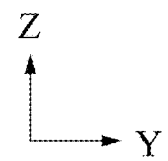

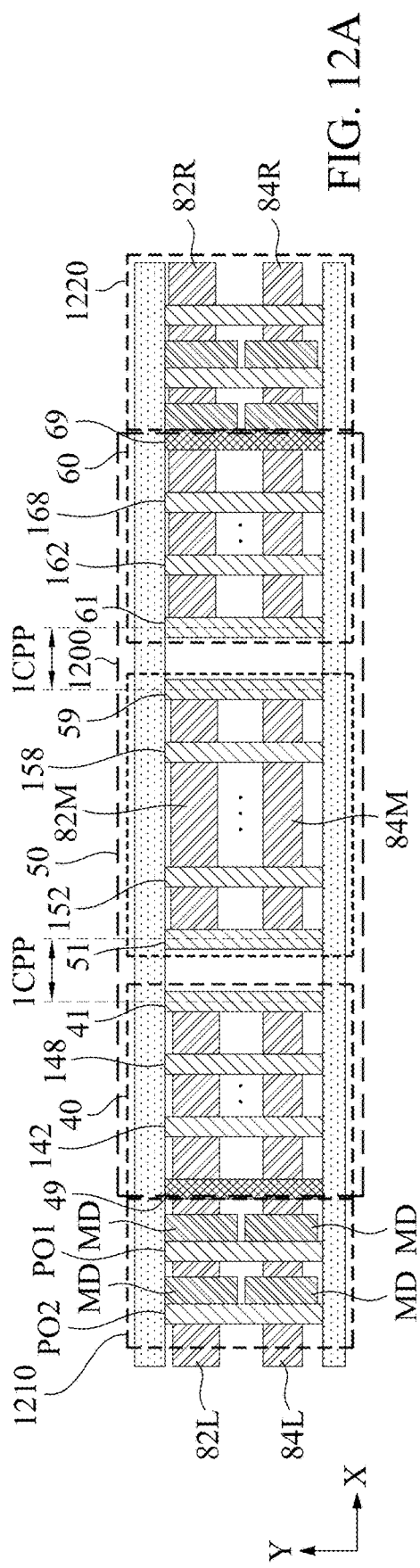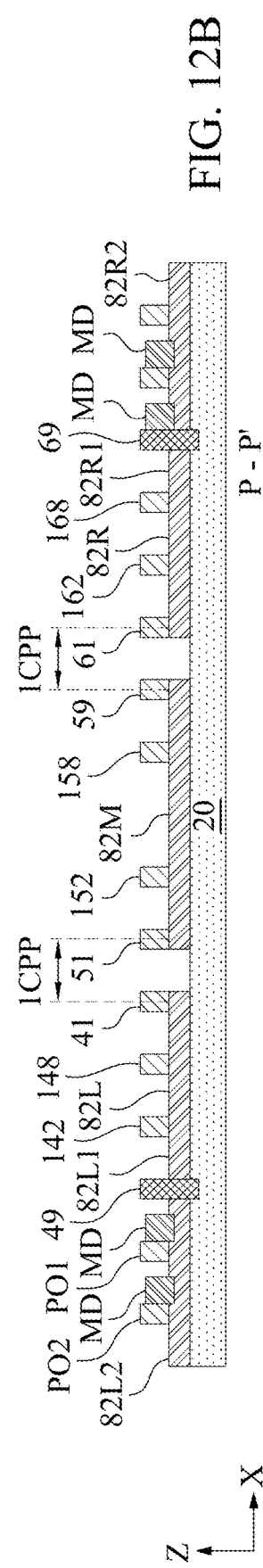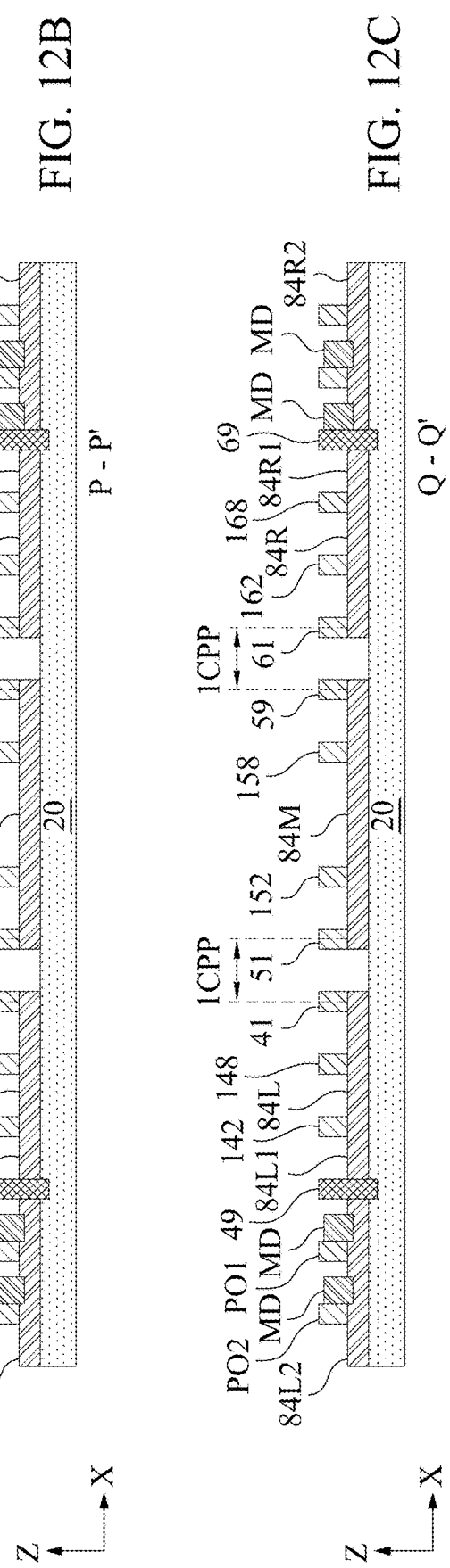
FIG. 12A
FIG. 12B
FIG. 12C

CIRCUIT ARRANGEMENTS HAVING REDUCED DEPENDENCY ON LAYOUT ENVIRONMENT

BACKGROUND

The recent trend in miniaturizing integrated circuits (ICs) has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout designs for integrated circuits while ensuring that the standard cell layout design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A-3D and FIGS. 3B(a)-3C(a) are cross-sectional views of the integrated circuits in FIGS. 1A-1C at selected cutting planes, in accordance with some embodiments.

FIGS. 5A-5D and FIG. 5B(a) are cross-sectional views of the integrated circuits in FIGS. 4A-4B at selected cutting planes, in accordance with some embodiments.

FIGS. 7A-7D and FIGS. 7A(a)-7D(a) are cross-sectional views of the integrated circuits of FIGS. 6A-6F at selected cutting planes, in accordance with some embodiments.

FIGS. 9A-9D and FIGS. 9A(a)-9B(a) are cross-sectional views of the integrated circuits of FIGS. 8A-8C at selected cutting planes, in accordance with some embodiments.

FIG. 12A is a layout diagram of a combined circuit cell and adjacent cells abutting the combined circuit cell, in accordance with some embodiments.

FIGS. 12B-12C are cross-sectional views of the integrated circuit in FIG. 12A, in accordance with some embodiments.

DETAILED DESCRIPTION

Figure 1A:
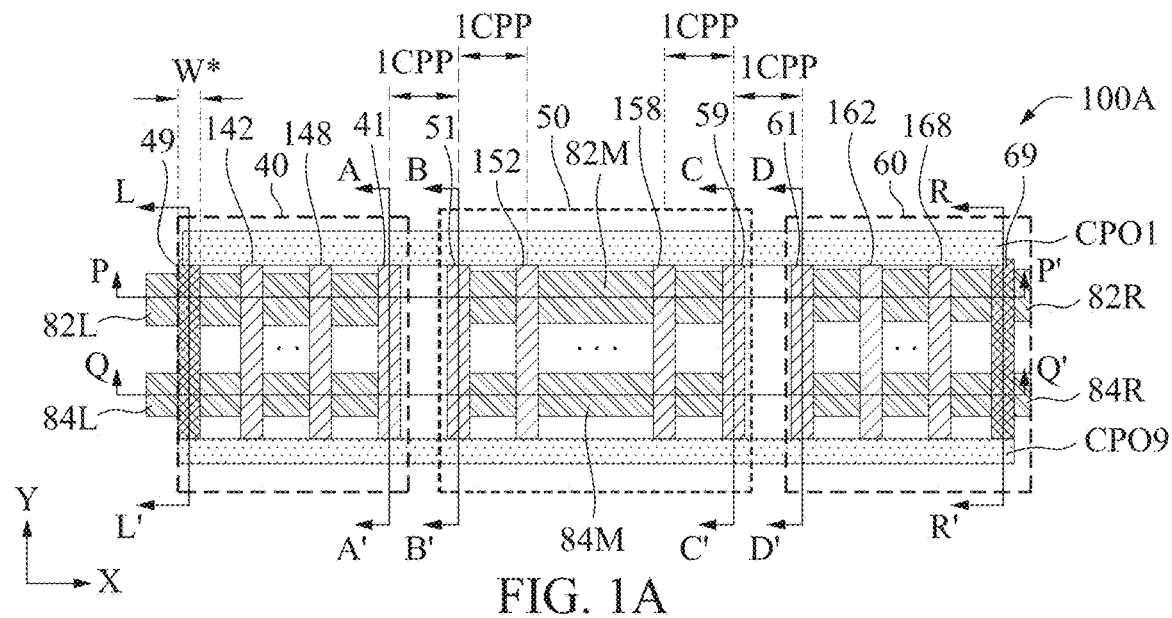
FIGS. 1A-1C are schematic layout diagrams of integrated circuits, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a combined circuit cell includes a main circuit between a group-one circuit and a group-two circuit. A group-one isolation structure separates a group-one active-region structure into a first part in the group-one circuit and a second part in a first adjacent circuit. A group-two isolation structure separates a group-two active-region structure into a first part in the group-two circuit and a second part in a second adjacent circuit. In some embodiments, each of the active-region structures includes channel regions, source regions, and drain regions of transistors. Even though the combined circuit cell in a layout design generated by an auto placement and routing (APR) program is still subject to layout environment changes, the main circuit's dependency on the layout environment is reduced. Because the group-one circuit and the group-two circuit separate the main circuit from the adjacent circuits, the variations/uncertainties of the time delays of the main circuit due to the layout environment changes are reduced, as compared with some alternative implementations in which the main circuit is used directly placed in the layout design by the APR program.

Figure 1B:
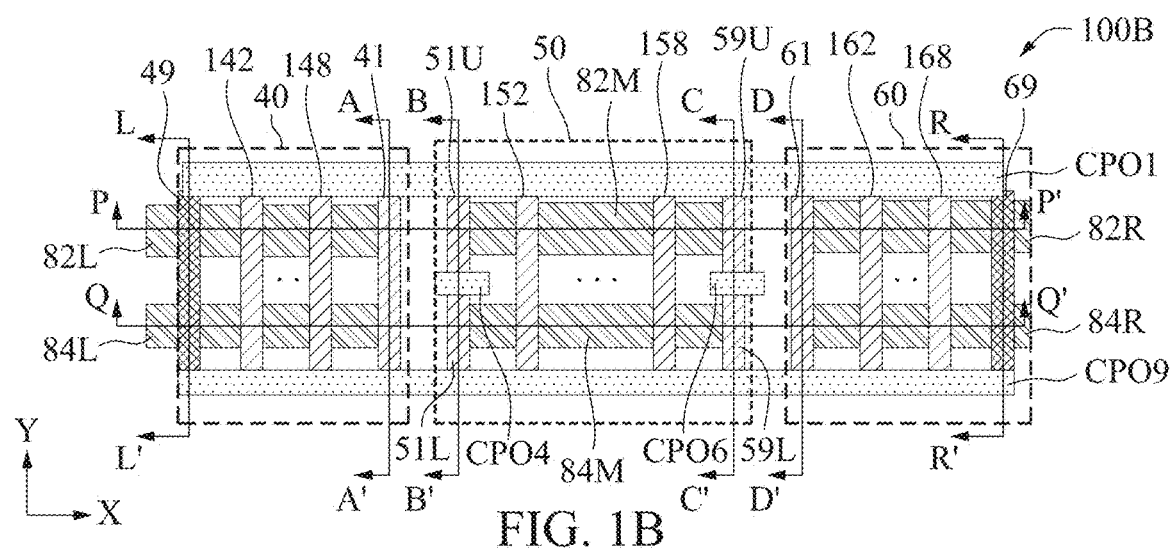
Figure 1C:
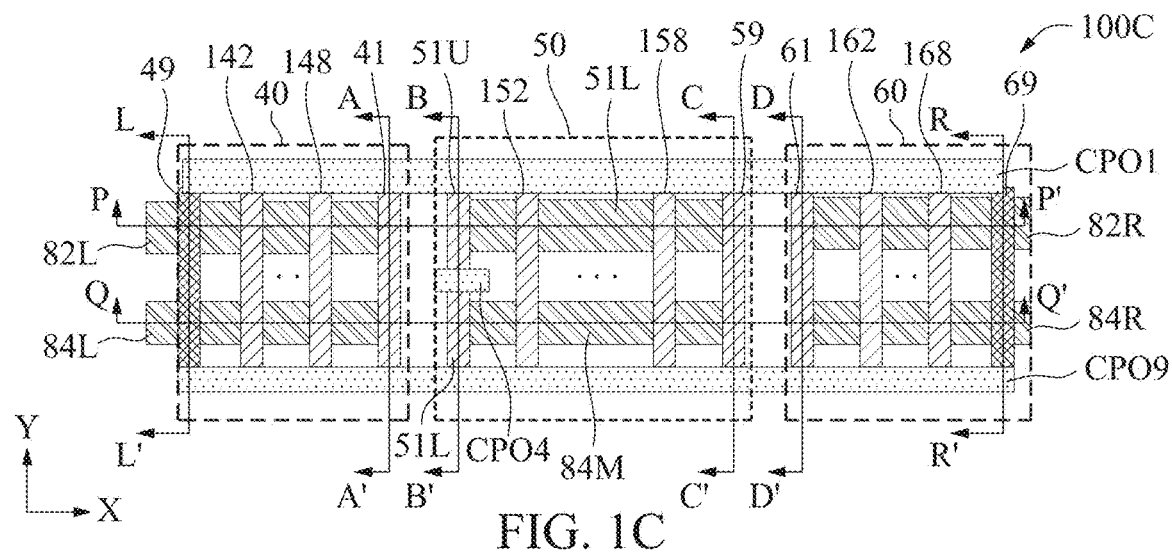

FIGS. 1A-1C are schematic layout diagrams of integrated circuits 100A, 100B, and 100C, in accordance with some embodiments. Each of the schematic layout diagrams of FIGS. 1A-1C includes layout patterns for specifying a group-one first-type active-region structure 82L extending in the X-direction, a middle first-type active-region structure 82M extending in the X-direction, and a group-two first-type active-region structure 82R extending in the X-direction. Each of the schematic layout diagrams of FIGS. 1A-1C also includes layout patterns for specifying a group-one second-type active-region structure 84L extending in the X-direction, a middle second-type active-region structure 84M extending in the X-direction, and a group-two second-type active-region structure 84R extending in the X-direction.

In addition, each of the schematic layout diagrams of FIGS. 1A-1C includes layout patterns for specifying a first boundary gate-conductor 51 extending in the Y-direction, a second boundary gate-conductor 59 extending in the Y-direction, a group-one boundary gate-conductor 41 extending in the Y-direction, and a group-two boundary gate-conductor 61 extending in the Y-direction, and various gate-conductors (e.g., 142, 148, 152, 158, 162, 168) extending in the Y-direction. Each of the schematic layout diagrams of FIGS. 1A-1C also includes layout patterns for specifying a group-one isolation structure 49 extending in the Y-direction and a group-two isolation structure 69 extending in the Y-direction. In the schematic layout diagrams of FIGS. 1A-1C, the Y-direction is perpendicular to the X-direction. The layout patterns CPO1 and CPO9 extending in the X-direction specify the cutting of the gate-conductors and the boundary gate-conductors. Each of the gate-conductors and the boundary gate-conductors, while extending in the Y-direction, is terminated before reaching the two horizontal boundaries (extending in the X-direction) of the circuit cell. Each of the gate-conductors and the boundary gate-conductors does not extend into the adjacent circuit cells.

As shown in the schematic layout diagrams of FIGS. 1A-1C, the middle first-type active-region structure 82M is between the group-one first-type active-region structure 82L and the group-two first-type active-region structure 82R. The middle first-type active-region structure 82M is aligned with the group-one first-type active-region structure 82L and the group-two first-type active-region structure 82R along the X-direction. The middle second-type active-region structure 84M is between the group-one second-type active-region structure 84L and the group-two second-type active-region structure 84R. The middle second-type active-region structure 84M is aligned with the group-one second-type active-region structure 84L and the group-two second-type active-region structure 84R along the X-direction.

In FIGS. 1A-1C, each of the active-region structures is either a p-type active-region structure or an n-type active-region structure. The transistors fabricated with the p-type active-region structure are PMOS, and the transistors fabricated with the n-type active-region structure are NMOS. In some embodiments, the active-region structures are fin structures, and the transistors fabricated with the active-region structures are FinFETs. In some embodiments, the active-region structures are nanosheet structures, and the transistors fabricated with the active-region structures are nanosheet transistors. In some embodiments, the active-region structures are nanowire structures, and the transistors fabricated with the active-region structures are nanowire transistors.

In some embodiments, each of the middle first-type active-region structure 82M, the group-one first-type active-region structure 82L, and the group-two first-type active-region structure 82R is a p-type active-region structure, while each of the middle second-type active-region structure 84M, the group-one second-type active-region structure 84L, and the group-two second-type active-region structure 84R is an n-type active-region structure. In some alternative embodiments, each of the middle first-type active-region structure 82M, the group-one first-type active-region structure 82L, and the group-two first-type active-region structure 82R is an n-type active-region structure, while each of the middle second-type active-region structure 84M, the group-one second-type active-region structure 84L, and the group-two second-type active-region structure 84R is a p-type active-region structure.

In FIGS. 1A-1C, each of the integrated circuits 100A, 100B, and 100C includes a main circuit 50, a group-one circuit 40, and a group-two circuit 60. The main circuit 50 includes a first boundary gate-conductor 51 and a second boundary gate-conductor 59. In FIG. 1A, the first boundary gate-conductor 51 intersects each of the middle active-region structures 82M and 84M at a first end of the corresponding middle active-region structure. The second boundary gate-conductor 59 intersects each of the middle active-region structures 82M and 84M at a second end of the corresponding middle active-region structure.

In FIG. 1B, the layout pattern CPO4 specifies that the first boundary gate-conductor 51 is cut into a first segment 51U and a second segment 51L, and the layout pattern CPO6 specifies that the second boundary gate-conductor 59 is cut into a first segment 59U and a second segment 59L. The first segment 51U and the second segment 51L of first boundary gate-conductor 51 intersect the middle active-region structures 82M and 84M correspondingly at a first end of the corresponding middle active-region structure. The first segment 59U and the second segment 59L of the second boundary gate-conductor 59 intersect the middle active-region structures 82M and 84M correspondingly at a second end of the corresponding middle active-region structure.

In FIG. 1C, the layout pattern CPO4 specifies that the first boundary gate-conductor 51 is cut into a first segment 51U and a second segment 51L. The first segment 51U and the second segment 51L of first boundary gate-conductor 51 intersect the middle active-region structures 82M and 84M correspondingly at a first end of the corresponding middle active-region structure. The second boundary gate-conductor 59 intersects each of the middle active-region structures 82M and 84M at a second end of the corresponding middle active-region structure.

In FIGS. 1A-1C, the main circuit 50 also includes gate-conductors (such as 152, . . . , and 158) extending in the Y-direction between the first boundary gate-conductor 51 and the second boundary gate-conductor 59. One or more gate-conductors in main circuit 50 intersect the middle active-region structures 82M and/or 84M at the channel regions of the transistors in the main circuit 50. In FIGS. 1A-1C, one or more gate-conductors (as represented by the symbol " . . . ") between the gate-conductors 152 and 158 are not explicitly depicted with gate-conductor patterns. The main circuit 50 also includes the terminal-conductors which are not explicitly depicted with terminal-conductor patterns in FIGS. 1A-1C. The terminal-conductors in main circuit 50 intersect the middle active-region structures 82M and/or 84M at the channel regions of the transistors in the main circuit 50. A terminal region is either a source region or a drain region. Other elements in the main circuit 50 which are not explicitly shown in FIGS. 1A-1C include various via-connectors and various routing conducting lines in one or more metal layers.

In FIGS. 1A-1C, at least one pair of adjacent gate-conductors in the main circuit 50 has a pitch distance equal to a contacted poly pitch ("CPP"). The pitch distance between the first boundary gate-conductor 51 and the gate-conductor 152 is one CPP, and the pitch distance between the second boundary gate-conductor 59 and the gate-conductor 158 is one CPP.

In FIGS. 1A-1C, the group-one circuit 40 includes a group-one boundary gate-conductor 41 and a group-one isolation structure 49. The group-one boundary gate-conductor 41 intersects each of the group-one active-region structures 82L and 84L at a first end of the corresponding group-one active-region structure. The group-one boundary gate-conductor 41 in the group-one circuit 40 is separated from the first boundary gate-conductor 51 in the main circuit 50 by a pitch distance of one CPP. Thus, the vertical boundaries (extending in the Y-direction) of the group-one circuit 40 and the main circuit 50 are separated by a pitch distance of one CPP. In some embodiments, the implementation of the group-one boundary gate-conductor 41 and the first boundary gate-conductor 51 at the ends of corresponding active-region structures is referred as the implementation of Poly On Diffusion Edge ("PODE").

In FIGS. 1A-1C, the group-one isolation structure 49 separates each of the group-one active-region structures 82L and 84L into a first part in the group-one circuit 40 and a second part in a first adjacent circuit. The width "W*" of the group-one isolation structure 49 along the X-direction is less than one half of the CPP. In some embodiments, the width "W*" of the group-one isolation structure 49 is less than one fourth of the CPP. In some embodiments, the implementation of separating an active-region structure (such as 82L or 84L) into two parts with the isolation structure (such as 49) is referred to as the implementation of Continuous Poly On Oxide Definition ("CPODE"), and the isolation structure (such as 49) is referred to as a CPODE isolation structure.

In FIGS. 1A-1C, the group-one circuit 40 also includes gate-conductors (such as 142, . . . , and 148) between the group-one isolation structure 49 and the group-one boundary gate-conductor 41. One or more gate-conductors (as represented by the symbol " . . . ") between the gate-conductors 142 and 148 are not explicitly depicted with gate-conductor patterns. In some embodiments, one or more of the gate-conductors (e.g., 142, . . . , 148) intersect the group-one active-region structures 82L and/or 84L at the channel regions of the transistors in the group-one circuit 40, and form gate terminals of the transistors. In some embodiments, one or more of the gate-conductors (e.g., 142, . . . , 148) intersect the group-one active-region structures 82L and/or 84L but do not function as gate terminals of the transistors in the group-one circuit 40. In some embodiments, the group-one circuit 40 also includes the terminal-conductors, which are not explicitly depicted with terminal-conductor patterns. In some embodiments, the terminal-conductors in the group-one circuit 40 intersect the group-one active-region structures 82L and/or 84L at the channel regions of the transistors in the group-one circuit 40, and form source/drain terminals of the transistors. In some embodiments, the terminal-conductors in the group-one circuit 40 intersect the group-one active-region structures 82L and/or 84L but do not function as source/drain terminals of the transistors in the group-one circuit 40. In some embodiments, the group-one circuit 40 also includes additional elements which are not explicitly shown in FIGS. 1A-1C. Examples of the additional elements include via-connectors and routing conducting lines in one or more metal layers.

In FIGS. 1A-1C, the group-two circuit 60 includes a group-two boundary gate-conductor 61 and a group-two isolation structure 69. The group-two boundary gate-conductor 61 intersects each of the group-two active-region structures 82R and 84R at a first end of the corresponding group-two active-region structure. The group-two boundary gate-conductor 61 in the group-two circuit 60 is separated from the second boundary gate-conductor 59 in the main circuit 50 by a pitch distance of one CPP. Thus, the vertical boundaries (extending in the Y-direction) of the group-two circuit 60 and the main circuit 50 are separated by a pitch distance of one CPP. In some embodiments, the implementation of the group-two boundary gate-conductor 61 and the second boundary gate-conductor 59 at the end of the corresponding active-region structure is referred to as the PODE implementation.

In FIGS. 1A-1C, the group-two isolation structure 69 separates each of the group-two active-region structures 82R and 84R into a first part in the group-two circuit 60 and a second part in a second adjacent circuit. The width "W*" of the group-two isolation structure 69 along the X-direction is less than one half of the CPP. In some embodiments, the width "W*" of the group-two isolation structure 69 is less than one fourth of the CPP. In some embodiments, the implementation of separating an active-region structure (such as 82R or 84R) into two parts with the isolation structure (such as 69) is referred as the CPODE implementation, and the isolation structure (such as 69) is referred to as a CPODE isolation structure.

In FIGS. 1A-1C, the group-two circuit 60 also includes gate-conductors (such as 162, . . . , and 168) between the group-two isolation structure 69 and the group-two boundary gate-conductor 61. One or more gate-conductors (as represented by the symbol " . . . ") between the gate-conductors 162 and 168 are not explicitly depicted with gate-conductor patterns. In some embodiments, one or more of the gate-conductors (e.g., 162, . . . , 168) intersect the group-two active-region structures 82R and/or 84R at the channel regions of the transistors in the group-two circuit 60, and form gate terminals of the transistors. In some embodiments, one or more of the gate-conductors (e.g., 162, . . . , 168) intersect the group-two active-region structures 82R and/or 84R but do not function as gate terminals of the transistors in the group-two circuit 60. In some embodiments, the group-two circuit 60 also includes the terminal-conductors, which are not explicitly depicted with terminal-conductor patterns. In some embodiments, the terminal-conductors in the group-two circuit 60 intersect the group-two active-region structures 82R and/or 84R at the channel regions of the transistors in the group-two circuit 60, and form source/drain terminals of the transistors. In some embodiments, the terminal-conductors in the group-two circuit 60 intersect the group-two active-region structures 82R and/or 84R but do not function as source/drain terminals of the transistors in the group-two circuit 60. In some embodiments, the group-two circuit 60 also includes additional elements which are not explicitly shown in FIGS. 1A-1C. Examples of the additional elements include via-connectors and routing conducting lines in one or more metal layers.

In FIGS. 1A-1C, examples of the main circuit 50 include clock circuits, logic gate circuits, or any functional circuits in which variations/uncertainties of the time delays require improvements when the circuit of interest is placed in a layout design by the APR program. Examples of the group-one circuit 40 and the group-two circuit 60 also include other logic gate circuits such as inverter gates, NAND gates, or NOR gates. One example of the group-one circuit 40 and the group-two circuit 60 is the inverter as depicted in FIGS. 10A-10C and FIG. 11. The meaning of the group-one circuit 40 is broadly construed to include any circuit structure having at least one gate-conductor between the group-one isolation structure 49 and the group-one boundary gate-conductor 41. Similarly, the meaning of the group-two circuit 60 is broadly construed to include any circuit structure having at least one gate-conductor between the group-two isolation structure 69 and the group-two boundary gate-conductor 61. The circuit structure of the group-one circuit 40 or the circuit structure of the group-two circuit 60 often forms a functional logic circuit. In some embodiments, however, the circuit structure of the group-one circuit 40 or the circuit structure of the group-two circuit 60 does not form a functional logic circuit. In some embodiments, the at least one gate-conductor in the group-one circuit 40 or in the group-two circuit 60 is a gate terminal of a transistor. In some embodiments, the at least one gate-conductor in the group-one circuit 40 or in the group-two circuit 60 is a dummy gate-conductor.

Figure 1D:
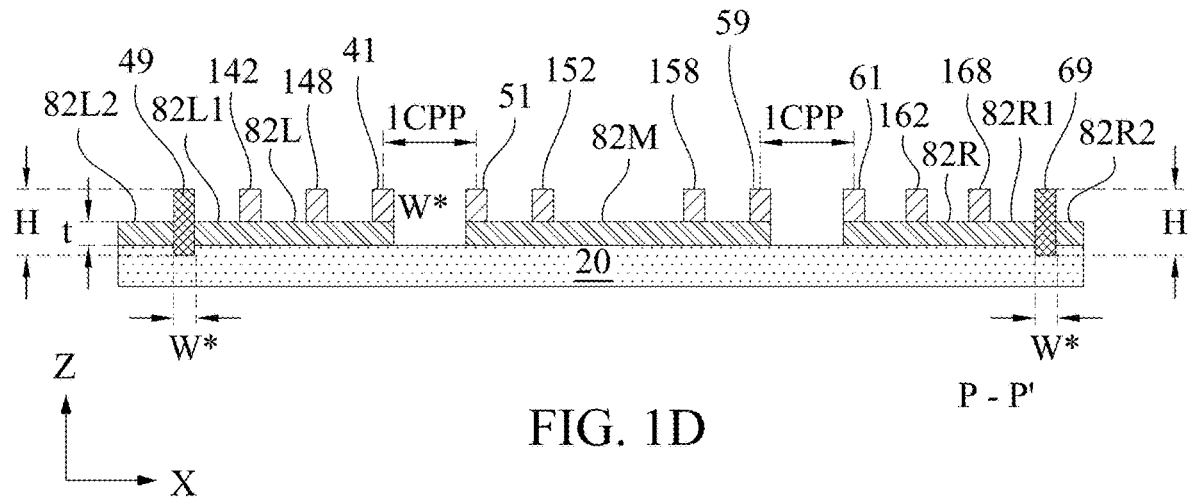
FIGS. 1D-1E are cross-sectional-views of integrated circuits in FIGS. 1A-1C, in accordance with some embodiments.
Figure 1E:
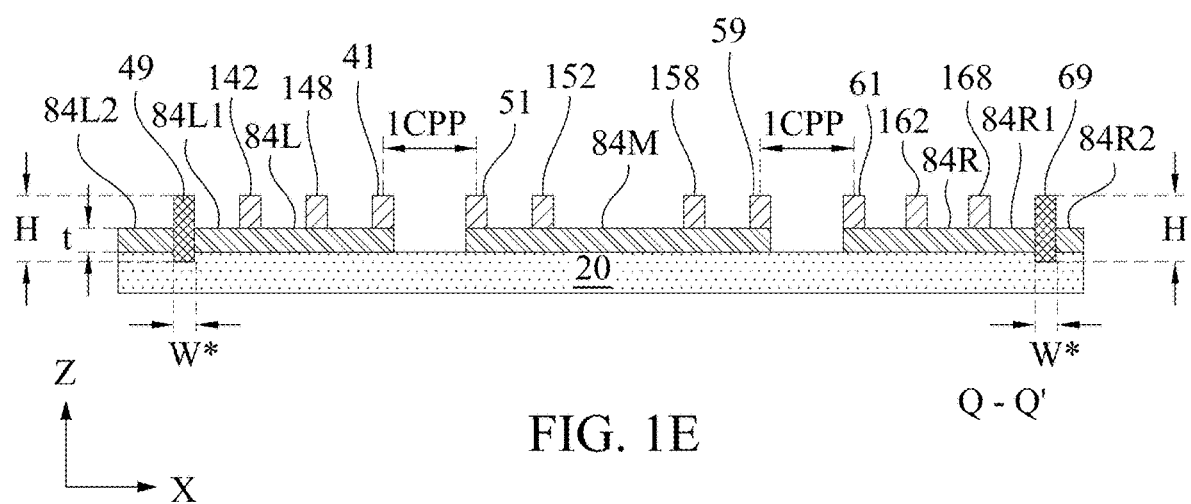

FIG. 1D is a schematic of the cross-sectional-view of integrated circuits in the cutting plane P-P' as specified by the layout diagrams in FIGS. 1A-1C, in accordance with some embodiments. FIG. 1E is a schematic of the cross-sectional-view of integrated circuits in the cutting plane Q-Q' as specified by the layout diagrams in FIGS. 1A-1C, in accordance with some embodiments.

In FIG. 1D, the first boundary gate-conductor 51 of the main circuit 50 intersects the middle first-type active-region structure 82M at the first end of the middle first-type active-region structure 82M, and the second boundary gate-conductor 59 of the main circuit 50 intersects the middle first-type active-region structure 82M at the second end of the middle first-type active-region structure 82M.

In FIG. 1D, the group-one boundary gate-conductor 41 of the group-one circuit 40 intersects the group-one first-type active-region structure 82L at the first end of the group-one first-type active-region structure 82L. The group-one isolation structure 49 of the group-one circuit 40 separates the group-one first-type active-region structure 82L into a first part 82L1 and a second part 82L2. The first part 82L1 of the group-one first-type active-region structure 82L is in the group-one circuit 40. The second part 82L2 of the group-one first-type active-region structure 82L is in the first adjacent circuit (which shares a common vertical boundary with the group-one circuit 40 at the group-one isolation structure 49). In some embodiments, the width "W*" of the group-one isolation structure 49 along the X-direction is less than one half of the CPP. In some embodiments, the width "W*" of the group-one isolation structure 49 is less than one fourth of the CPP. In some embodiments, the group-one isolation structure 49 is a CPODE isolation structure.

In FIG. 1D, the group-two boundary gate-conductor 61 of the group-two circuit 60 intersects the group-two first-type active-region structure 82R at the first end of the group-two first-type active-region structure 82R. The group-two isolation structure 69 of the group-two circuit 60 separates the group-two first-type active-region structure 82R into a first part 82R1 and a second part 82R2. The first part 82R1 of the group-two first-type active-region structure 82R is in the group-two circuit 60. The second part 82R2 of the group-two first-type active-region structure 82R is in the second adjacent circuit (which shares a common vertical boundary with the group-two circuit 60 at the group-two isolation structure 69). In some embodiments, the width "W*" of the group-two isolation structure 69 along the X-direction is less than one half of the CPP. In some embodiments, the width "W*" of the group-two isolation structure 69 is less than one fourth of the CPP. In some embodiments, the group-two isolation structure 69 is a CPODE isolation structure.

In FIG. 1E, the first boundary gate-conductor 51 of the main circuit 50 intersects the middle second-type active-region structure 84M at the first end of the middle second-type active-region structure 84M, and the second boundary gate-conductor 59 of the main circuit 50 intersects the middle second-type active-region structure 84M at the second end of the middle second-type active-region structure 84M.

In FIG. 1E, the group-one boundary gate-conductor 41 of the group-one circuit 40 intersects the group-one second-type active-region structure 84L at the first end of the group-one second-type active-region structure 84L. The group-one isolation structure 49 of the group-one circuit 40 separates the group-one second-type active-region structure 84L into a first part 84L1 and a second part 84L2. The first part 84L1 of the group-one second-type active-region structure 84L is in the group-one circuit 40. The second part 84L2 of the group-one second-type active-region structure 84L is in the first adjacent circuit (which shares a common vertical boundary with the group-one circuit 40 at the group-one isolation structure 49).

In FIG. 1E, the group-two boundary gate-conductor 61 of the group-two circuit 60 intersects the group-two second-type active-region structure 84R at the first end of the group-two second-type active-region structure 84R. The group-two isolation structure 69 of the group-two circuit 60 separates the group-two second-type active-region structure 84R into a first part 84R1 and a second part 84R2. The first part 84R1 of the group-two second-type active-region structure 84R is in the group-two circuit 60. The second part 84R2 of the group-two second-type active-region structure 84R is in the second adjacent circuit (which shares a common vertical boundary with the group-two circuit 60 at the group-two isolation structure 69).

In FIG. 1D and FIG. 1E, the group-one boundary gate-conductor 41 in the group-one circuit 40 is separated from the first boundary gate-conductor 51 in the main circuit 50 by a pitch distance of one CPP. The group-two boundary gate-conductor 61 in the group-two circuit 60 is also separated from the second boundary gate-conductor 59 in the main circuit 50 by a pitch distance of one CPP. The gate-conductors (such as 152, . . . , and 158) in the main circuit 50 are between the first boundary gate-conductor 51 and the second boundary gate-conductor 59. In some embodiments of FIG. 1D, each of the gate-conductors 152 and 158 intersects the middle first-type active-region structure 82M at the channel region of a first-type transistor. In some embodiments of FIG. 1E, each of the gate-conductors 152 and 158 intersects the middle second-type active-region structure 84M at the channel region of a second-type transistor.

In FIG. 1D and FIG. 1E, the gate-conductors 142 and 148 in the group-one circuit 40 are between the group-one boundary gate-conductor 41 and the group-one isolation structure 49. The gate-conductors 162 and 168 in the group-two circuit 60 are between the group-two boundary gate-conductor 61 and the group-two isolation structure 69. In FIG. 1D, the gate-conductors 142 and 148 in the group-one circuit 40 intersect the group-one first-type active-region structure 82L, while the gate-conductors 162 and 168 in the group-two circuit 60 intersect the group-two first-type active-region structure 82R. In FIG. 1E, the gate-conductors 142 and 148 in the group-one circuit 40 intersect the group-one second-type active-region structure 84L, while the gate-conductors 162 and 168 in the group-two circuit 60 intersect the group-two second-type active-region structure 84R.

In FIG. 1D and FIG. 1E, the active-region structures (e.g., 82L, 82M, 82R, 84L, 84M, and 84R) are fabricated on an insulator support 20 (such as a substrate). In some embodiments, the group-one isolation structure 49 extends into the insulator support 20, to separate the group-one first-type active-region structure 82L into the first part 82L1 and the second part 82L2, and to separate the group-one second-type active-region structure 84L into the first part 84L1 and the second part 84L2. The group-one isolation structure 49 also has a height "H" larger than the thickness "t" of the group-one active-region structures 82L and 84L. In some embodiments, the group-two isolation structure 69 extends into the insulator support 20, to separate the group-two first-type active-region structure 82R into the first part 82R1 and the second part 82R2, and to separate the group-two second-type active-region structure 84R into the first part 84R1 and the second part 84R2. The group-two isolation structure 69 also has a height "H" larger than the thickness "t" of the group-two active-region structures 82R and 84R.

In FIGS. 1A-1C, when the main circuit 50 is combined with the group-one circuit 40 and the group-two circuit 60 to form a combined circuit cell, the combined circuit cell has a first vertical boundary (extending in the Y-direction) at the group-one isolation structure 49 and has a second vertical boundary (extending in the Y-direction) at the group-two isolation structure 69.

Figure 2A:
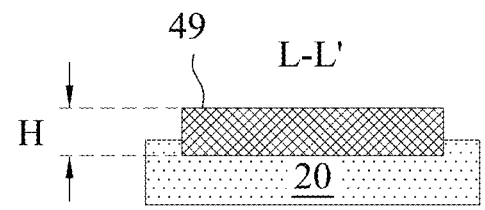
FIGS. 2A-2B and FIGS. 2A(a)-2B(a) are cross-sectional views of the integrated circuits at the boundaries of the circuit cells in FIGS. 1A-1C, in accordance with some embodiments.
Figure 2B:
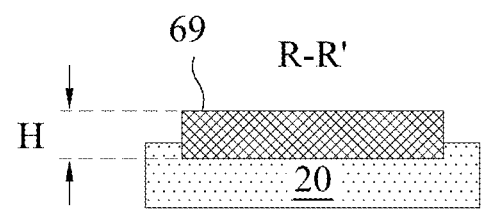
Figure 2A:
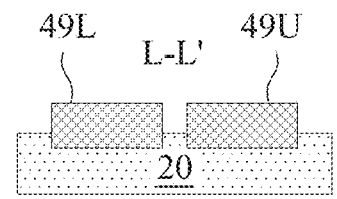
Figure 2B:
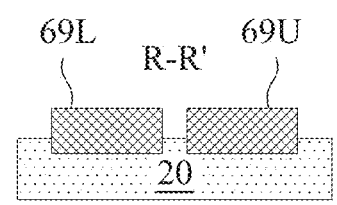

FIGS. 2A-2B and FIGS. 2A(a)-2B(a) are cross-sectional views of the integrated circuits at the cutting planes L-L', R-R' passing though the isolation structures at the boundaries of the combined circuit cells, as specified by the layout diagrams in FIGS. 1A-1C, in accordance with some embodiments. The cross-sectional views of the integrated circuits 100A-100C in cutting planes as specified by the lines L-L' and R-R' are correspondingly depicted in FIGS. 2A-2B. In FIG. 2A, the group-one isolation structure 49 separates the group-one first-type active-region structures 82L into the first part 82L1 and the second part 82L2, and the group-one isolation structure 49 also separates the group-one second-type active-region structures 84L into the first part 84L1 and the second part 84L2. In FIG. 2B, the group-two isolation structure 69 separates the group-two first-type active-region structures 82R into the first part 82R1 and the second part 82R2, and the group-two isolation structure 49 also separates the group-two second-type active-region structures 84R into the first part 84R1 and the second part 84R2.

In some alternative embodiments, the group-one isolation structure 49 in FIG. 2A is replaced with two group-one isolation structures 49U and 49L in FIG. 2A(a). The group-one isolation structure 49U separates the group-one first-type active-region structure 82L into the first part 82L1 and the second part 82L2. The group-one isolation structure 49L separates the group-one second-type active-region structure 84L into two the first part 84L1 and the second part 84L2. In some alternative embodiments, the group-two isolation structure 69 in FIG. 2B is replaced with two group-two isolation structures 69U and 69L in FIG. 2B(a). The group-two isolation structure 69U separates the group-two first-type active-region structure 82R into the first part 82R1 and the second part 82R2. The group-two isolation structure 69L separates the group-two second-type active-region structure 84R into the first part 84R1 and the second part 84R2.

FIGS. 3A-3D and FIGS. 3B(a)-3C(a) are cross-sectional views of the integrated circuits at selected cutting planes, as specified by the layout diagrams in FIGS. 1A-1C, in accordance with some embodiments.

The cross-sectional views of the integrated circuit 100A in cutting planes as specified by the lines A-A', B-B', C-C', and D-D' are correspondingly depicted in FIG. 3A, FIG. 3B, FIG. 3C, and FIG. 3D. In FIG. 3A, the group-one boundary gate-conductor 41 intersects both the group-one first-type active-region structure 82L and the group-one second-type active-region structure 84L. In FIG. 3B, the first boundary gate-conductor 51 of the main circuit 50 intersects both the middle first-type active-region structure 82M and the middle second-type active-region structure 84M. In FIG. 3C, the second boundary gate-conductor 59 of the main circuit 50 intersects both the middle first-type active-region structure 82M and the middle second-type active-region structure 84M. In FIG. 3D, the group-two boundary gate-conductor 61 intersects both the group-two first-type active-region structure 82R and the group-two second-type active-region structure 84R.

The cross-sectional views of the integrated circuit 100B in cutting planes as specified by the lines A-A', B-B', C-C', and D-D' are correspondingly depicted in FIG. 3A, FIG. 3B(a), FIG. 3C(a), and FIG. 3D. In FIG. 3A, the group-one boundary gate-conductor 41 intersects both the group-one first-type active-region structure 82L and the group-one second-type active-region structure 84L. In FIG. 3B(a), the first segment 51U of the first boundary gate-conductor 51 intersects the middle first-type active-region structure 82M, while the second segment 51L of the first boundary gate-conductor 51 intersects the middle second-type active-region structure 84M. In FIG. 3C(a), the first segment 59U of the second boundary gate-conductor 59 intersects the middle first-type active-region structure 82M, while the second segment 59L of the second boundary gate-conductor 59 intersects the middle second-type active-region structure 84M. In FIG. 3D, the group-two boundary gate-conductor 61 intersects both the group-two first-type active-region structure 82R and the group-two second-type active-region structure 84R.

The cross-sectional views of the integrated circuit 100C in cutting planes as specified by the lines A-A', B-B', C-C', and D-D' are correspondingly depicted in FIG. 3A, FIG. 3B(a), FIG. 3C, and FIG. 3D. In FIG. 3A, the group-one boundary gate-conductor 41 intersects both the group-one first-type active-region structure 82L and the group-one second-type active-region structure 84L. In FIG. 3B(a), the first segment 51U of the first boundary gate-conductor 51 intersects the middle first-type active-region structure 82M, while the second segment 51L of the first boundary gate-conductor 51 intersects the middle second-type active-region structure 84M. In FIG. 3C, the second boundary gate-conductor 59 of the main circuit 50 intersects both the middle first-type active-region structure 82M and the middle second-type active-region structure 84M. In FIG. 3D, the group-two boundary gate-conductor 61 intersects both the group-two first-type active-region structure 82R and the group-two second-type active-region structure 84R.

In the layout diagrams of FIG. 1A-1C, a first end of each middle active-region structure (82M or 84M) is separated with a gap from the corresponding group-one active-region structure, and a second end of each middle active-region structure (82M or 84M) is separated from the corresponding group-two active-region structure along the X-direction. In some alternative embodiments, such as in the integrated circuits 400A-400B of FIG. 4A-4B, one end of each middle active-region structure is joined with the corresponding group-two active-region structure along the X-direction.

Figure 4A:
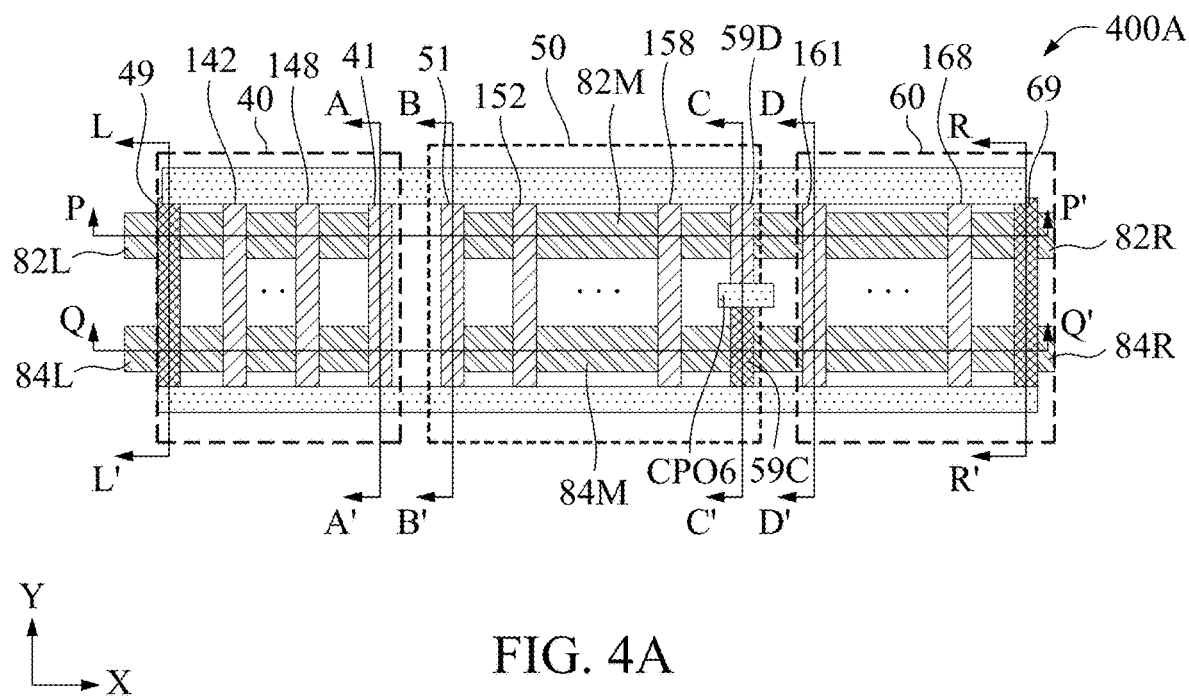
FIGS. 4A-4B are schematic layout diagrams of integrated circuits, in accordance with some embodiments.
Figure 4B:
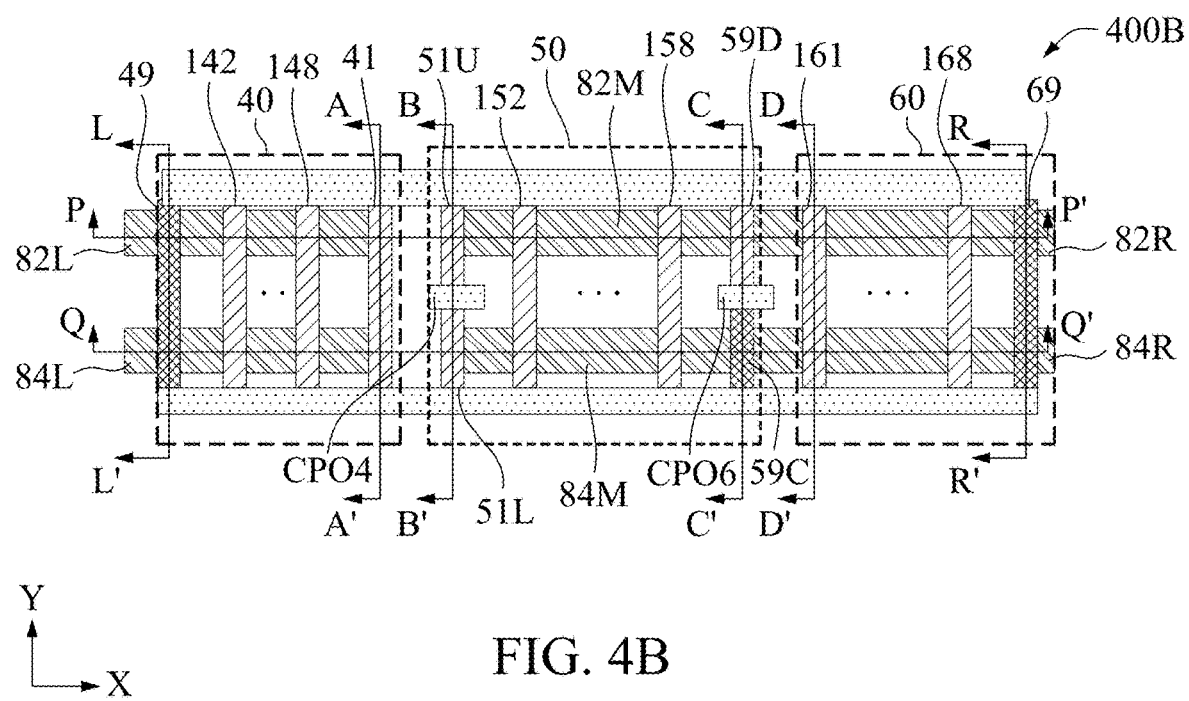

FIGS. 4A-4B are schematic layout diagrams of integrated circuits 400A-400B, in accordance with some embodiments. The layout diagram of the integrated circuit 400A in FIG. 4A is a modification of the layout diagram of the integrated circuit 100A in FIG. 1A. The layout diagram of the integrated circuit 400B in FIG. 4B is a modification of the layout diagram of the integrated circuit 100C in FIG. 1C. The modification includes substituting the layout pattern for the second boundary gate-conductor 59 (in FIG. 1A or FIG. 1C) with the layout patterns for the dummy gate-conductor 59D and the boundary isolation structure 59C (in FIG. 4A or FIG. 4B). The modification also includes adding the layout pattern CPO6 which separates the layout pattern for the dummy gate-conductor 59D and the layout pattern for the boundary isolation structure 59C. The modification further includes joining the layout pattern for each of the middle active-region structures (82M or 84M) with the corresponding layout pattern for the group-two active-region structures (82R or 84R). In FIGS. 4A-FIG. 4B, the layout pattern for the group-two boundary gate-conductor 61 (which is in FIGS. 1A-FIG. 1C) is also removed.

Figure 4C:
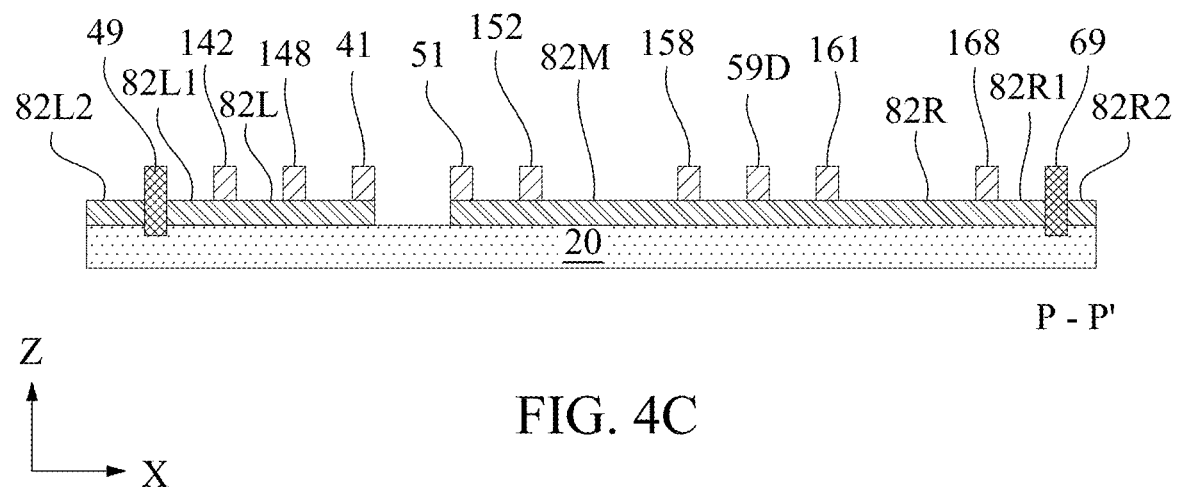
FIGS. 4C-4D are cross-sectional-views of integrated circuits in FIGS. 4A-4B, in accordance with some embodiments.
Figure 4D:
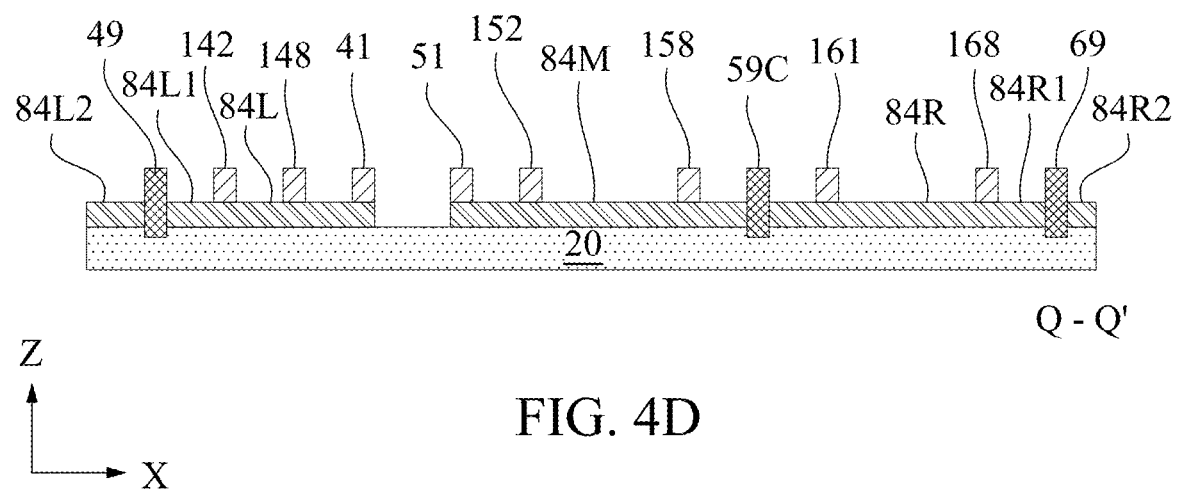

FIG. 4C is a schematic of the cross-sectional-view of integrated circuits 400A-400B in the cutting plane P-P' as specified by the layout diagrams in FIGS. 4A-4B, in accordance with some embodiments. FIG. 4D is a schematic of the cross-sectional-view of integrated circuits 400A-400B in the cutting plane Q-Q' as specified by the layout diagrams in FIGS. 4A-4B, in accordance with some embodiments.

The cross-sectional-view in FIG. 4C is a modification of the cross-sectional-view in FIG. 1D. The difference between FIG. 4C and FIG. 1D is in the connectivity between the middle first-type active-region structures 82M and the group-two first-type active-region structures 82R. In the integrated circuits 400A-400B, as shown in FIG. 4C, the middle first-type active-region structure 82M is joined with the group-two first-type active-region structure 82R underneath the dummy gate-conductor 59D and forms a single first-type active-region structure. As a comparison, in the integrated circuits 100A-100C, as shown in FIG. 1D, the middle first-type active-region structure 82M is separated from the group-two first-type active-region structure 82R by a gap between the second boundary gate-conductor 59 and the group-two boundary gate-conductor 61. In some embodiments, the gap between the middle first-type active-region structure 82M and the group-two first-type active-region structure 82R in FIG. 1D is larger than one half of the CPP.

The cross-sectional-view in FIG. 4D is a modification of the cross-sectional-view in FIG. 1E. The difference between FIG. 4D and FIG. 1E is in the connectivity between the middle second-type active-region structures 84M and the group-two second-type active-region structures 84R. In the integrated circuits 400A-400B, as shown in FIG. 4D, while the boundary isolation structure 59C (such as a CPODE isolation structure) physically joins the middle second-type active-region structure 84M with the group-two second-type active-region structure 84R, the boundary isolation structure 59C also forms the electrical isolation between the middle second-type active-region structure 84M and the group-two second-type active-region structure 84R. As a comparison, in the integrated circuits 100A-100C, as shown in FIG. 1E, the middle second-type active-region structure 84M is separated from the group-two second-type active-region structure 84R by a gap between the second boundary gate-conductor 59 and the group-two boundary gate-conductor 61.

FIGS. 5A-5D and FIG. 5B(a) are cross-sectional views of the integrated circuits at selected cutting planes, as specified by the layout diagrams in FIGS. 4A-4B, in accordance with some embodiments.

The cross-sectional views of the integrated circuits 400A-400B in cutting planes as specified by the line A-A' is depicted in FIG. 5A. In FIG. 5A, the group-one boundary gate-conductor 41 intersects both the group-one first-type active-region structure 82L and the group-one second-type active-region structure 84L.

The cross-sectional views of the integrated circuit 400A in the cutting plane as specified by the lines B-B' is depicted in FIG. 5B. The cross-sectional views of the integrated circuit 400B in the cutting plane as specified by the line B-B' is depicted in FIG. 5B(a). In FIG. 5B, the first boundary gate-conductor 51 of the main circuit 50 intersects both the middle first-type active-region structure 82M and the middle second-type active-region structure 84M. In FIG. 5B(a), the first segment 51U of the first boundary gate-conductor 51 intersects the middle first-type active-region structure 82M, while the second segment 51L of the first boundary gate-conductor 51 intersects the middle second-type active-region structure 84M.

The cross-sectional views of the integrated circuits 400A-400B in cutting planes as specified by the line C-C' is depicted in FIG. 5C. In FIG. 5C, the boundary isolation structure 59C (such as a CPODE isolation structure) physically joins the middle second-type active-region structure 84M with the group-two second-type active-region structure 84R and at the same time provides the electrical isolation between the middle second-type active-region structure 84M and the group-two second-type active-region structure 84R. Additionally, in FIG. 5C, the dummy gate-conductor 59D intersects the middle first-type active-region structure 82M.

The cross-sectional views of the integrated circuits 400A-400B in cutting planes as specified by the line D-D' is depicted in FIG. 5D. In FIG. 5D, the gate-conductor 161 intersects both the group-two first-type active-region structure 82R and the group-two second-type active-region structure 84R.

In the layout diagrams of FIG. 1A-1C, a first end of each middle active-region structure (82M or 84M) is separated with a gap from the corresponding group-one active-region structure, and a second end of each middle active-region structure (82M or 84M) is from the corresponding group-two active-region structure along the X-direction. In some alternative embodiments, such as in the integrated circuits 600A-600F of FIGS. 6A-6F, the middle first-type active-region structure 82M is joined with both the group-one first-type active-region structures 82L and the group-two first-type active-region structure 82R.

Figure 6A:
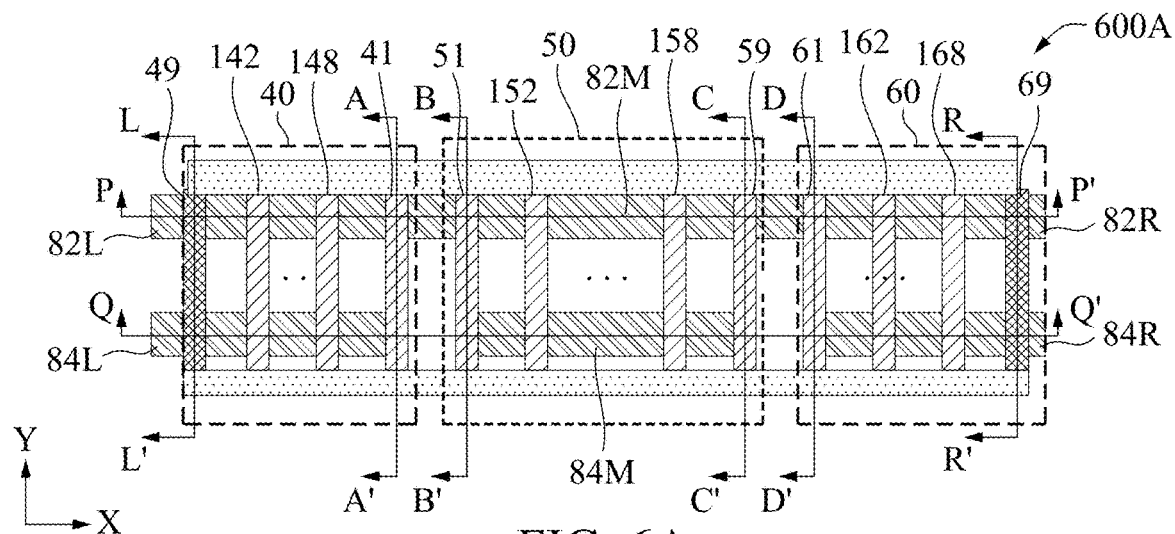
FIGS. 6A-6F are schematic layout diagrams of integrated circuits, in accordance with some embodiments.

FIGS. 6A-6F are schematic layout diagrams of integrated circuits 600A-600F, in accordance with some embodiments. The layout diagram of the integrated circuit 600A in FIG. 6A is a modification of the layout diagram of the integrated circuit 100A in FIG. 1A. Similar to the integrated circuit 100A in FIG. 1A, the integrated circuit 600A in FIG. 6A includes a main circuit 50, a group-one circuit 40, and a group-two circuit 60.

In FIG. 6A, the main circuit 50 includes a first boundary gate-conductor 51 and a second boundary gate-conductor 59. The first boundary gate-conductor 51 intersects each of the middle active-region structures 82M and 84M at a first end of the corresponding middle active-region structure. The second boundary gate-conductor 59 intersects each of the middle active-region structures 82M and 84M at a second end of the corresponding middle active-region structure. The main circuit 50 also includes gate-conductors (such as 152, . . . , and 158) extending in the Y-direction between the first boundary gate-conductor 51 and the second boundary gate-conductor 59. One or more gate-conductors in main circuit 50 intersects the middle active-region structures 82M and/or 84M at the channel regions of the transistors in the main circuit 50. Elements in the main circuit 50 which are not explicitly shown in FIG. 6A include the gate-conductors (as represented by the symbol " . . . ") between the gate-conductors 152 and 158, the terminal-conductors for the source terminal or drain terminal of the transistors, various via-connectors, and various routing conducting lines in one or more metal layers.

In FIG. 6A, the group-one circuit 40 includes a group-one boundary gate-conductor 41 and a group-one isolation structure 49. The group-one boundary gate-conductor 41 intersects each of the group-one active-region structures 82L and 84L at a first end of the corresponding group-one active-region structure. The group-one boundary gate-conductor 41 in the group-one circuit 40 is separated from the first boundary gate-conductor 51 in the main circuit 50 by a pitch distance of one CPP. The group-one isolation structure 49 separates each of the group-one active-region structures 82L and 84L into a first part in the group-one circuit 40 and a second part in a first adjacent circuit. The group-one circuit 40 also includes gate-conductors (such as 142, . . . , and 148) between the group-one isolation structure 49 and the group-one boundary gate-conductor 41. Elements in the group-one circuit 40 which are not explicitly shown in FIG. 6A include gate-conductors (as represented by the symbol " . . . ") between the gate-conductors 142 and 148, the terminal-conductors for the source terminal or drain terminal of the transistors, various via-connectors, and various routing conducting lines in one or more metal layers.

In FIG. 6A, the group-two circuit 60 includes a group-two boundary gate-conductor 61 and a group-two isolation structure 69. The group-two boundary gate-conductor 61 intersects each of the group-two active-region structures 82R and 84R at a first end of the corresponding group-two active-region structure. The group-two boundary gate-conductor 61 in the group-two circuit 60 is separated from the second boundary gate-conductor 59 in the main circuit 50 by a pitch distance of one CPP. The group-two isolation structure 69 separates each of the group-two active-region structures 82R and 84R into a first part in the group-two circuit 60 and a second part in a second adjacent circuit. Elements in the group-two circuit 60 which are not explicitly shown in FIG. 6A include gate-conductors (as represented by the symbol " . . . ") between the gate-conductors 162 and 168, the terminal-conductors for the source terminal or drain terminal of the transistors, various via-connectors, and various routing conducting lines in one or more metal layers.

Figure 6B:
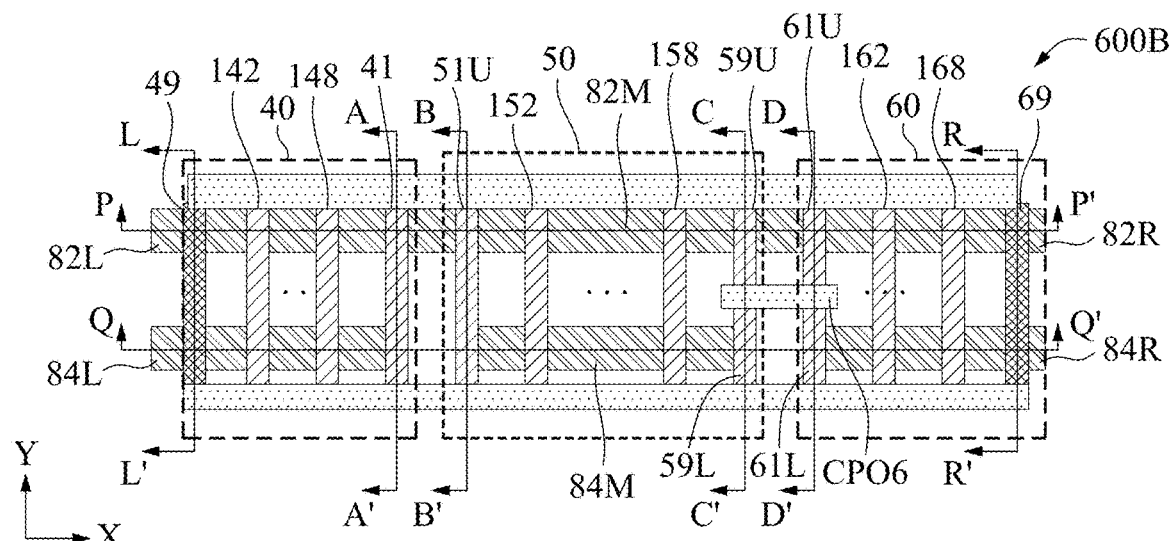

The integrated circuit 600B in FIG. 6B is a modification of the integrated circuit 600A in FIG. 6A. In FIG. 6B, as specified by the layout pattern CPO6, the second boundary gate-conductor 59 in FIG. 6A is divided into a first segment 59U and a second segment 59L, and the group-two boundary gate-conductor 61 in FIG. 6A is divided into a first segment 61U and a second segment 61L.

Figure 6C:
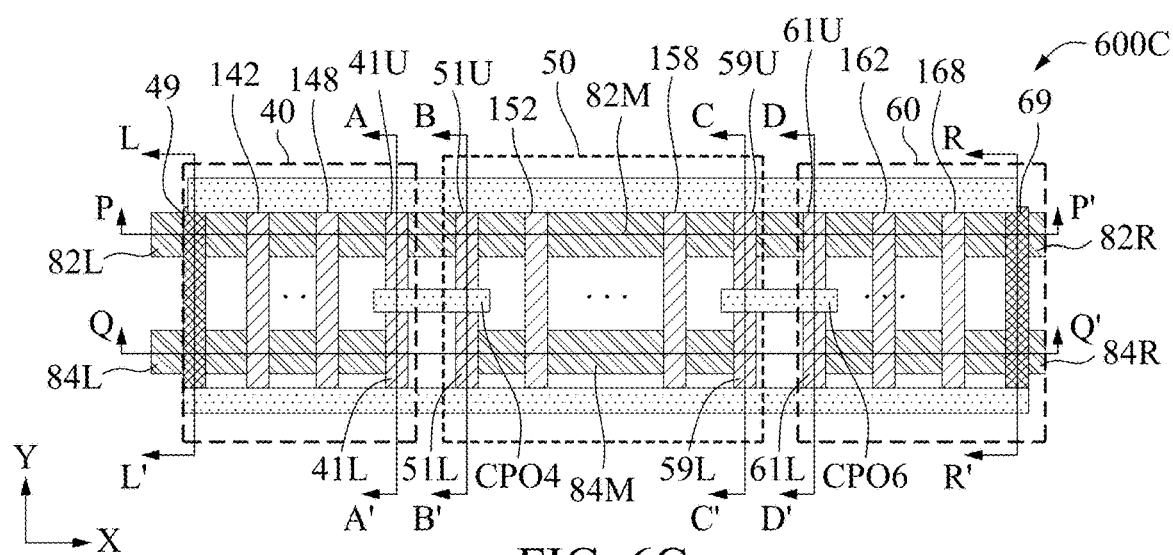

The integrated circuit 600C in FIG. 6C is a modification of the integrated circuit 600B in FIG. 6B. In FIG. 6C, as specified by the layout pattern CPO4, the first boundary gate-conductor 51 in FIG. 6B is divided into a first segment 51U and a second segment 51L, and the group-one boundary gate-conductor 41 in FIG. 6B is divided into a first segment 41U and a second segment 41L.

Figure 6D:
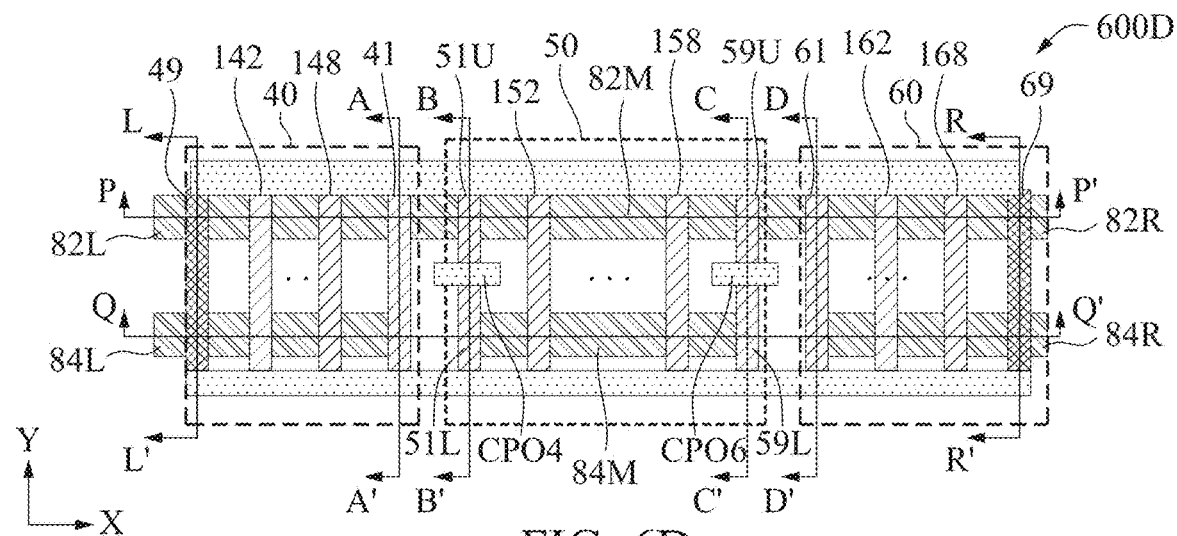

The integrated circuit 600D in FIG. 6D is a modification of the integrated circuit 600A in FIG. 6A. In FIG. 6D, as specified by the layout pattern CPO4, the first boundary gate-conductor 51 in FIG. 6A is divided into a first segment 51U and a second segment 51L. In FIG. 6D, as specified by the layout pattern CPO6, the second boundary gate-conductor 59 in FIG. 6A is divided into a first segment 59U and a second segment 59L.

Figure 6E:
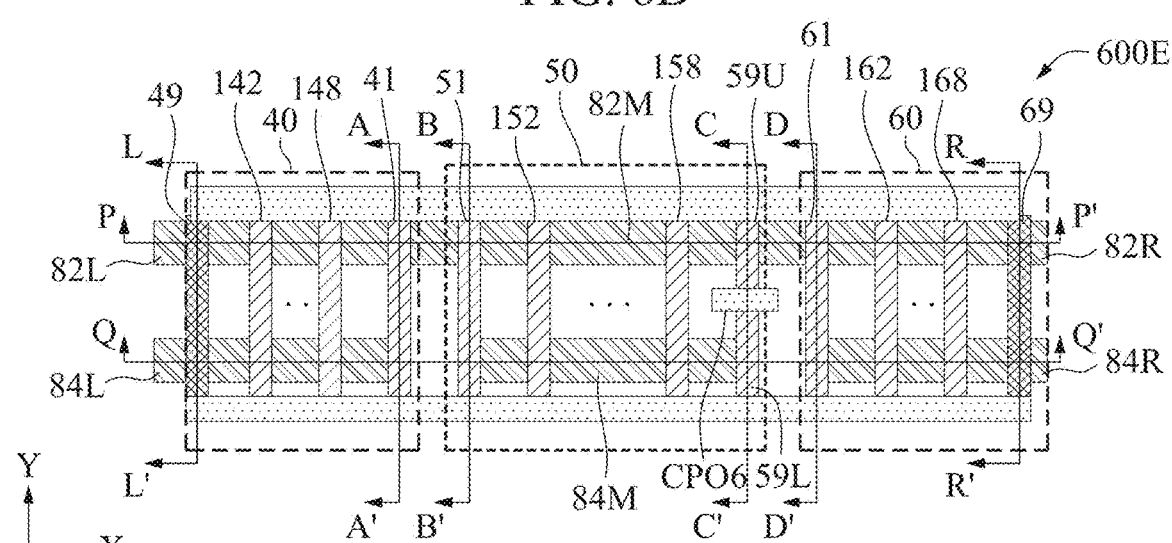

The integrated circuit 600E in FIG. 6E is a modification of the integrated circuit 600A in FIG. 6A. In FIG. 6E, as specified by the layout pattern CPO6, the second boundary gate-conductor 59 in FIG. 6A is divided into a first segment 59U and a second segment 59L.

Figure 6F:
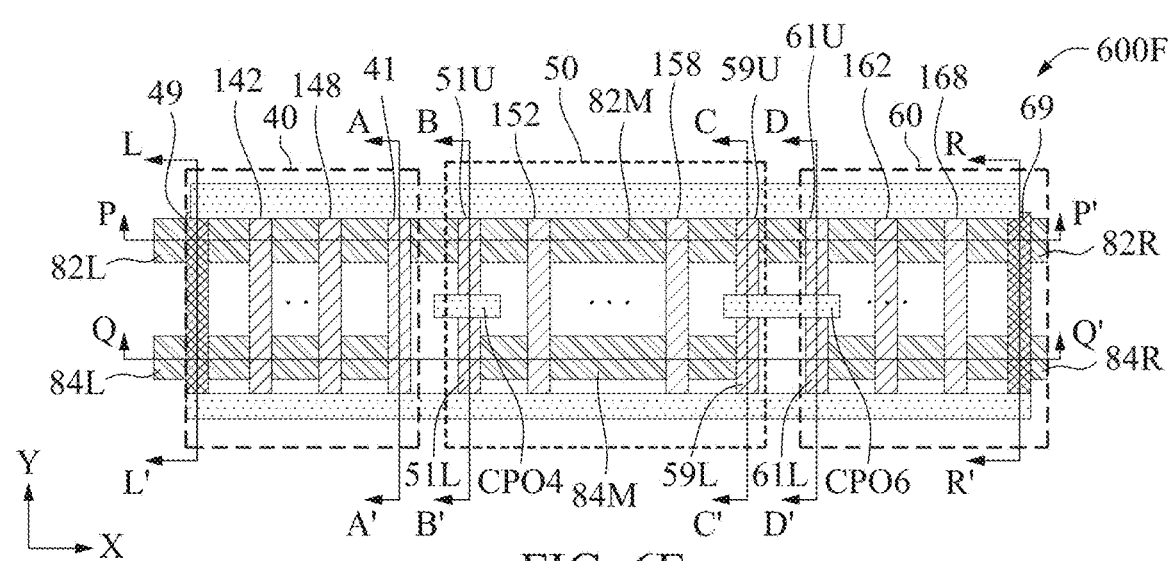

The integrated circuit 600F in FIG. 6F is a modification of the integrated circuit 600B in FIG. 6B. In FIG. 6F, as specified by the layout pattern CPO4, the first boundary gate-conductor 51 in FIG. 6B is divided into a first segment 51U and a second segment 51L.

Figure 6G:
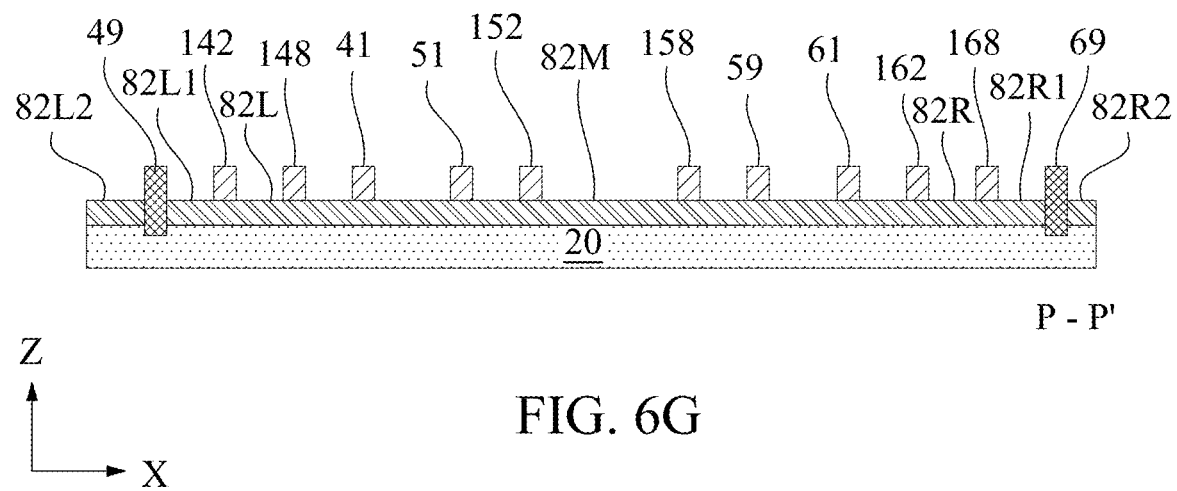
FIGS. 6G-6H are cross-sectional-views of integrated circuits in FIGS. 6A-6F, in accordance with some embodiments.
Figure 6H:
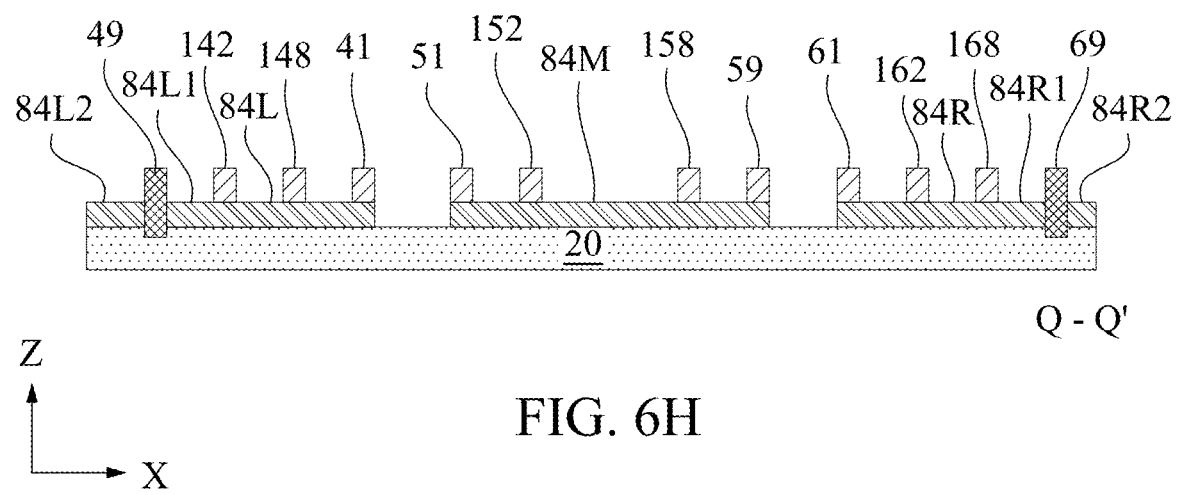

FIG. 6G is a schematic of the cross-sectional-view of integrated circuits 600A-600F in the cutting plane P-P' as specified by the layout diagrams in FIGS. 6A-6F, in accordance with some embodiments. FIG. 6H is a schematic of the cross-sectional-view of integrated circuits 600A-600F in the cutting plane Q-Q' as specified by the layout diagrams in FIGS. 6A-6F, in accordance with some embodiments.

The cross-sectional-view in FIG. 6G is a modification of the cross-sectional-view in FIG. 1D. The difference between FIG. 6G and FIG. 1D is in the connectivity between the middle first-type active-region structures 82M and the group-one first-type active-region structures 82L and in the connectivity between the middle first-type active-region structures 82M and the group-two first-type active-region structures 82R. In the integrated circuits 600A-600F, as shown in FIG. 6G, the middle first-type active-region structure 82M is joined with both the group-one first-type active-region structures 82L and the group-two first-type active-region structure 82R. In contrast, in the integrated circuits 100A-100C, as shown in FIG. 1D, one end of the middle first-type active-region structure 82M is separated from the group-one first-type active-region structures 82L, and another end of the middle first-type active-region structure 82M is separated from the group-two first-type active-region structure 82R.

The cross-sectional-view in FIG. 6H is identical to the cross-sectional-view in FIG. 1E. In both FIG. 6H and FIG. 1E, one end of the middle second-type active-region structure 84M is separated from the group-one second-type active-region structures 84L, and another end of the middle second-type active-region structure 84M is separated from the group-two second-type active-region structure 84R.

FIGS. 7A-7D and FIGS. 7A(a)-7D(a) are cross-sectional views of the integrated circuits at selected cutting planes, as specified by the layout diagrams in FIGS. 6A-6F, in accordance with some embodiments.

The cross-sectional views of the integrated circuits 600A-600B and 600D-600F in the cutting plane as specified by the line A-A' are depicted in FIG. 7A. The cross-sectional view of the integrated circuit 600C in the cutting plane as specified by the line A-A' is depicted in FIG. 7A(a). In FIG. 7A, the group-one boundary gate-conductor 41 intersects both the group-one first-type active-region structure 82L and the group-one second-type active-region structure 84L. In FIG. 7A(a), the first segment 41U of the group-one boundary gate-conductor 41 intersects the group-one first-type active-region structure 82L, while the second segment 41L of the group-one boundary gate-conductor 41 intersects the group-one second-type active-region structure 84L.

The cross-sectional views of the integrated circuit 600A-600B and 600E in the cutting plane as specified by the line B-B' are depicted in FIG. 7B. The cross-sectional views of the integrated circuits 600C-600D and 600F in the cutting plane as specified by the line B-B' are depicted in FIG. 7B(a). In FIG. 7B, the first boundary gate-conductor 51 of the main circuit 50 intersects both the middle first-type active-region structure 82M and the middle second-type active-region structure 84M. In FIG. 7B(a), the first segment 51U of the first boundary gate-conductor 51 intersects the middle first-type active-region structure 82M, while the second segment 51L of the first boundary gate-conductor 51 intersects the middle second-type active-region structure 84M.

The cross-sectional view of the integrated circuit 600A in the cutting plane as specified by the line C-C' is depicted in FIG. 7C. The cross-sectional views of the integrated circuits 600B-600F in the cutting plane as specified by the line C-C' are depicted in FIG. 7C(a). In FIG. 7C, the second boundary gate-conductor 59 of the main circuit 50 intersects both the middle first-type active-region structure 82M and the middle second-type active-region structure 84M. In FIG. 7C(a), the first segment 59U of the second boundary gate-conductor 59 intersects the middle first-type active-region structure 82M, while the second segment 59L of the second boundary gate-conductor 59 intersects the middle second-type active-region structure 84M.

The cross-sectional views of the integrated circuits 600A, 600D, and 600E in the cutting plane as specified by the line D-D' are depicted in FIG. 7D. The cross-sectional views of the integrated circuits 600B-600C and 600F in the cutting plane as specified by the line D-D' are depicted in FIG. 7D(a). In FIG. 7D, the group-two boundary gate-conductor 61 intersects both the group-two first-type active-region structure 82R and the group-two second-type active-region structure 84R. In FIG. 7D(a), the first segment 61U of the group-two boundary gate-conductor 61 intersects the group-two first-type active-region structure 82R, while the second segment 61L of the group-two boundary gate-conductor 61 intersects the group-two second-type active-region structure 84R.

In the layout diagrams of FIG. 6A-6F, the first end of the middle second-type active-region structure 84M is separated (along the X-direction with a gap) from the group-one second-type active-region structure 84L, and the second end of the middle second-type active-region structure 84M is separated (along the X-direction with a gap) from the group-two second-type active-region structure 84R. In some alternative embodiments, such as in the integrated circuits 800A-800C of FIGS. 8A-8C, the boundary isolation structure 59C physically joins the middle second-type active-region structure 84M with the group-two second-type active-region structure 84R and at the same time provides the electrical isolation between the middle second-type active-region structure 84M and the group-two second-type active-region structure 84R. Additionally, in FIGS. 8A-8C, the dummy gate-conductor 59D intersects the middle first-type active-region structure 82M.

Figure 8A:
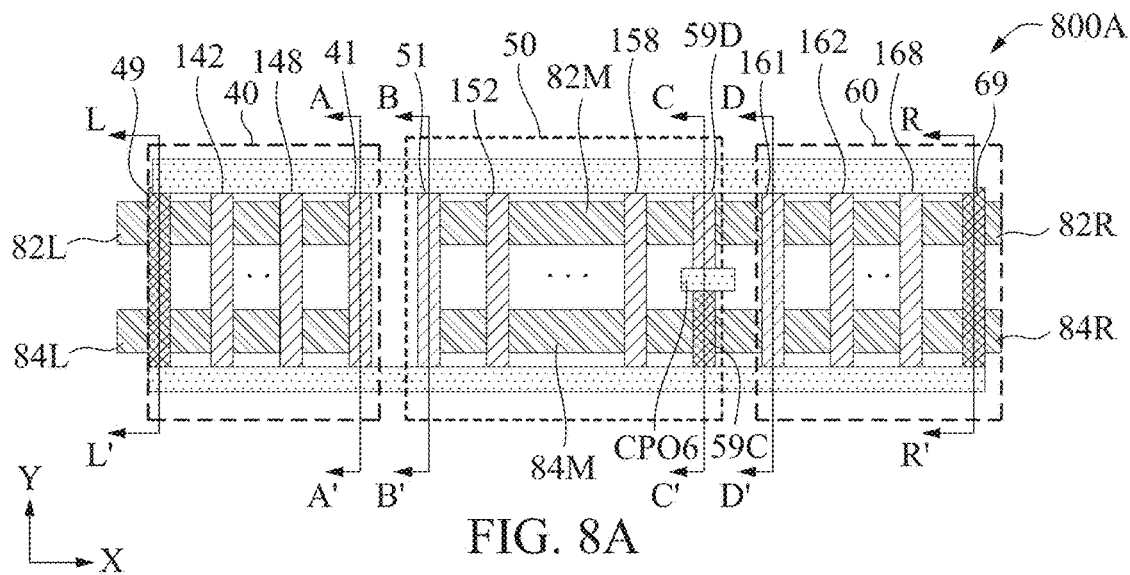
FIGS. 8A-8C are schematic layout diagrams of integrated circuits, in accordance with some embodiments.
Figure 8B:
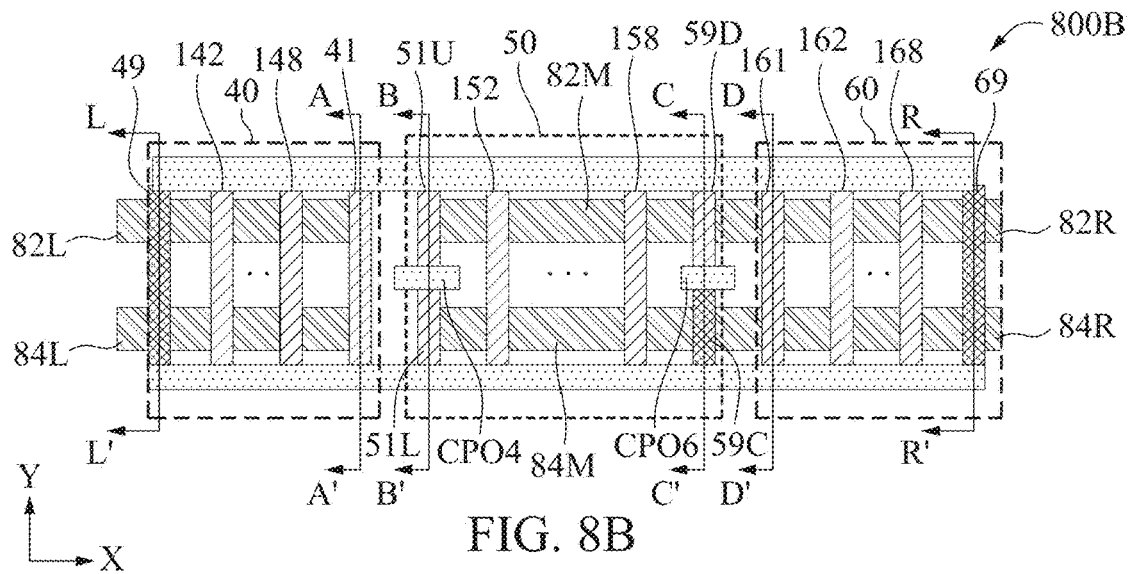
Figure 8C:
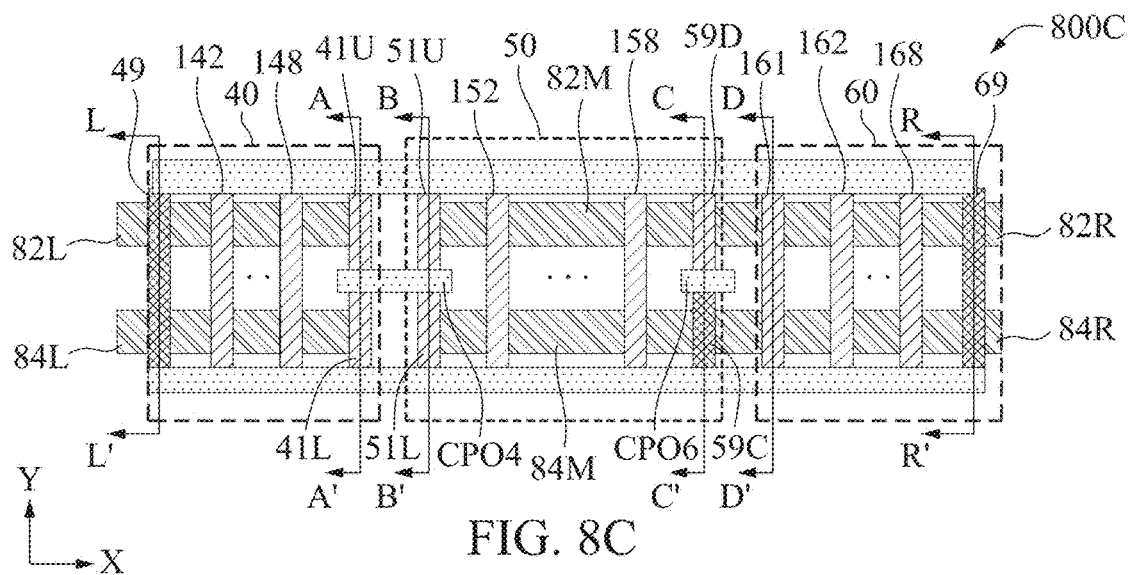

FIGS. 8A-8C are schematic layout diagrams of integrated circuits 800A-800C, in accordance with some embodiments. The layout diagram of the integrated circuit 800A in FIG. 8A is a modification of the layout diagram of the integrated circuit 600E in FIG. 6E. The difference between FIG. 8A and FIG. 6E is in the connectivity between the middle second-type active-region structures 84M and the group-two second-type active-region structures 84R. In the integrated circuit 800A, as shown in FIG. 8A, the middle second-type active-region structure 84M is joined with the group-two second-type active-region structure 84R by the boundary isolation structure 59C. As a comparison, in the integrated circuit 600E, as shown in FIG. 6E, the middle second-type active-region structure 84M is separated from the group-two second-type active-region structure 84R by a gap extending in the X-direction.

The integrated circuit 800B in FIG. 8B is a modification of the integrated circuit 800A in FIG. 8A. In FIG. 8B, as specified by the layout pattern CPO4, the first boundary gate-conductor 51 in FIG. 8A is divided into a first segment 51U and a second segment 51L.

The integrated circuit 800C in FIG. 8C is a modification of the integrated circuit 800A in FIG. 8A. In FIG. 8C, as specified by the layout pattern CPO4, the first boundary gate-conductor 51 in FIG. 8A is divided into a first segment 51U and a second segment 51L, and the group-one boundary gate-conductor 41 in FIG. 8A is divided into a first segment 41U and a second segment 41L.

Figure 8D:
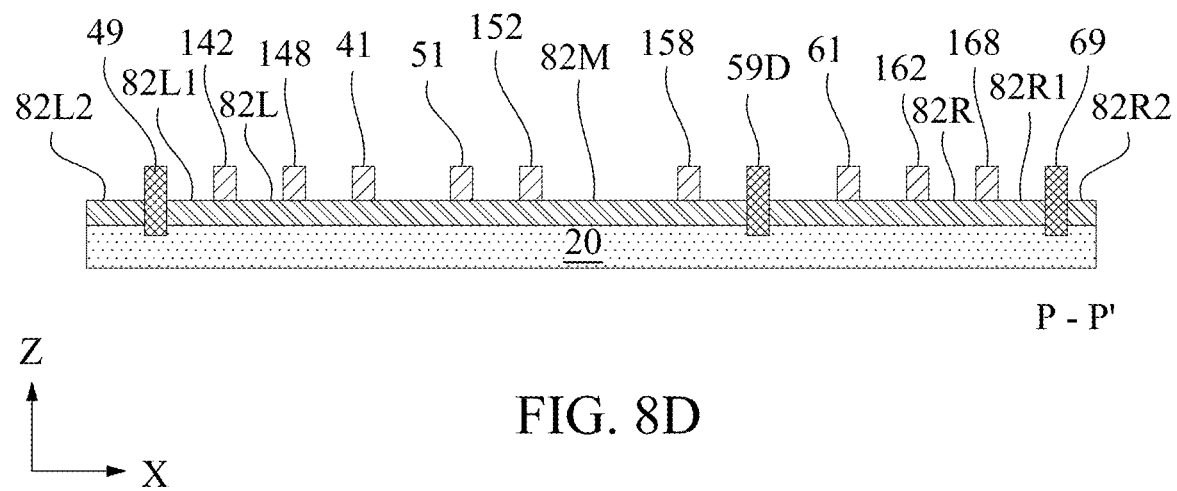
FIGS. 8D-8E are cross-sectional-views of integrated circuits in FIGS. 8A-8C, in accordance with some embodiments.
Figure 8E:
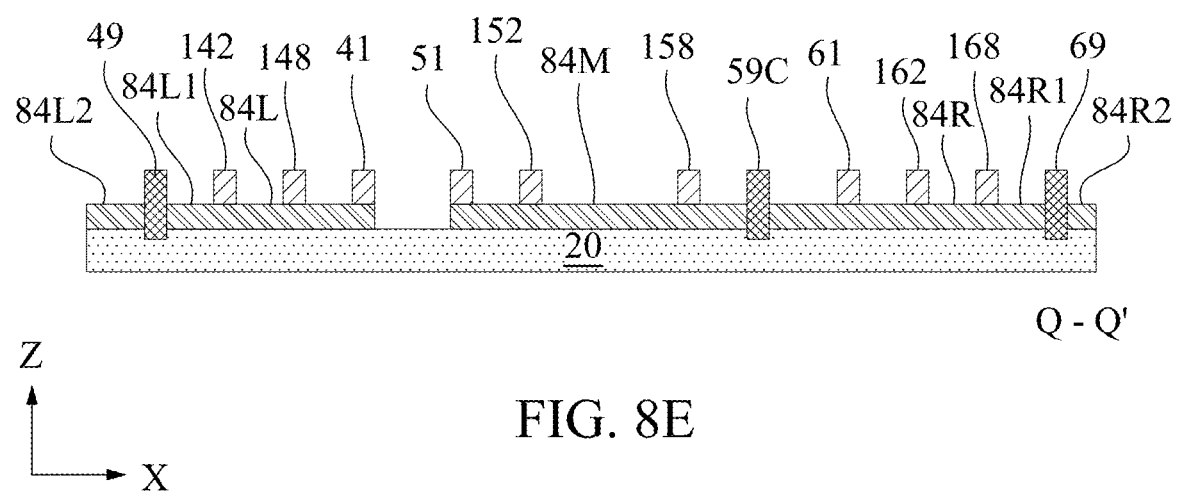

FIG. 8D is a schematic of the cross-sectional-view of integrated circuits 800A-800C in the cutting plane P-P' as specified by the layout diagrams in FIGS. 8A-8C, in accordance with some embodiments. FIG. 8E is a schematic of the cross-sectional-view of integrated circuits 800A-800C in the cutting plane Q-Q' as specified by the layout diagrams in FIGS. 8A-8C, in accordance with some embodiments.

The cross-sectional-view in FIG. 8D is similar to the cross-sectional-view in FIG. 6G. In both FIG. 8D and FIG. 6G, the middle first-type active-region structure 82M is joined with both the group-one first-type active-region structures 82L and the group-two first-type active-region structure 82R. The dummy gate-conductor 59D and the gate-conductor 161 in FIG. 8D, however, replace the second boundary gate-conductor 59 and the group-two boundary gate-conductor 61 in FIG. 6G.

The cross-sectional-view in FIG. 8E is identical to the cross-sectional in FIG. 4D. In both FIG. 8E and FIG. 4D, the boundary isolation structure 59C physically joins the middle second-type active-region structure 84M with the group-two second-type active-region structure 84R, while the boundary isolation structure 59C also forms the electrical isolation between the middle second-type active-region structure 84M and the group-two second-type active-region structure 84R. In both FIG. 8E and FIG. 4D, the middle second-type active-region structure 84M is separated from the group-one second-type active-region structures 84L with a gap extending in the X-direction.

FIGS. 9A-9D and FIGS. 9A(a)-9B(a) are cross-sectional views of the integrated circuits at selected cutting planes, as specified by the layout diagrams in FIGS. 8A-8C, in accordance with some embodiments.

The cross-sectional views of the integrated circuits 800A-800B in the cutting plane as specified by the line A-A' are depicted in FIG. 9A. The cross-sectional view of the integrated circuit 800C in the cutting plane as specified by the line A-A' is depicted in FIG. 9A(a). In FIG. 9A, the group-one boundary gate-conductor 41 intersects both the group-one first-type active-region structure 82L and the group-one second-type active-region structure 84L. In FIG. 9A(a), the first segment 41U of the group-one boundary gate-conductor 41 intersects the group-one first-type active-region structure 82L, while the second segment 41L of the group-one boundary gate-conductor 41 intersects the group-one second-type active-region structure 84L.

The cross-sectional view of the integrated circuit 800A in the cutting plane as specified by the line B-B' is depicted in FIG. 9B. The cross-sectional views of the integrated circuits 800B-800C in the cutting plane as specified by the line B-B' are depicted in FIG. 9B(a). In FIG. 9B, the first boundary gate-conductor 51 of the main circuit 50 intersects both the middle first-type active-region structure 82M and the middle second-type active-region structure 84M. In FIG. 9B(a), the first segment 51U of the first boundary gate-conductor 51 intersects the middle first-type active-region structure 82M, while the second segment 51L of the first boundary gate-conductor 51 intersects the middle second-type active-region structure 84M.

The cross-sectional views of the integrated circuits 800A-800C in the cutting plane as specified by the line C-C' are depicted in FIG. 9C. In FIG. 9C, the boundary isolation structure 59C physically joins the middle second-type active-region structure 84M with the group-two second-type active-region structure 84R and at the same time provides the electrical isolation between the middle second-type active-region structure 84M and the group-two second-type active-region structure 84R. Additionally, in FIG. 9C, the dummy gate-conductor 59D intersects the middle first-type active-region structure 82M.

The cross-sectional views of the integrated circuits 800A-800C in the cutting plane as specified by the line D-D' are depicted in FIG. 9D. In FIG. 9D, the gate-conductor 161 intersects both the group-two first-type active-region structure 82R and the group-two second-type active-region structure 84R.

Figure 10A:
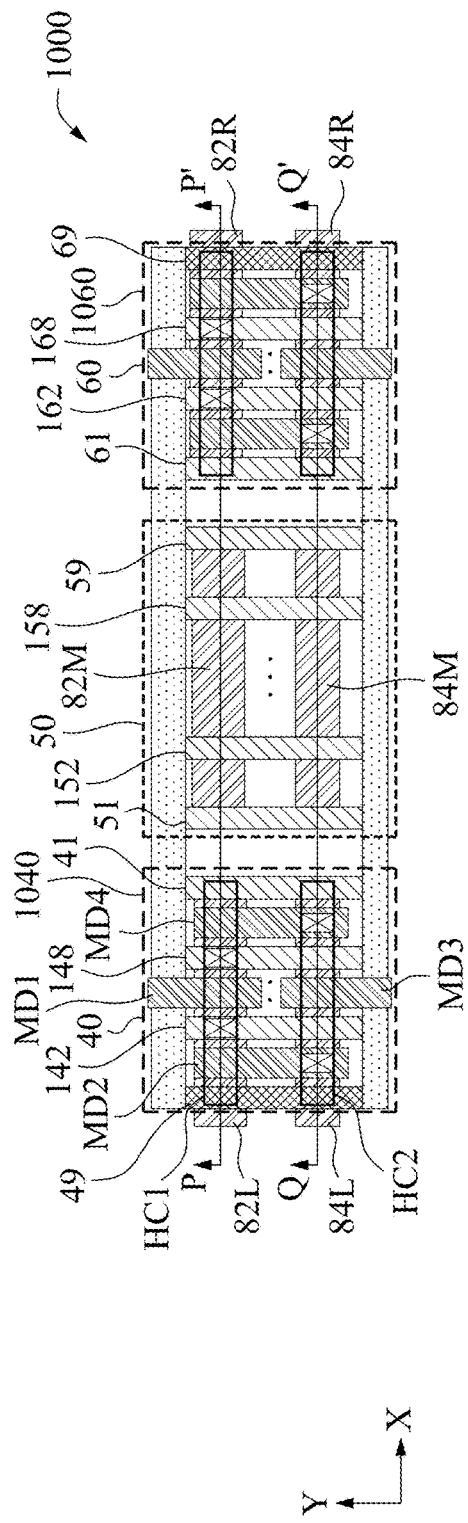
FIG. 10A is a layout diagram of an integrated circuit having the main circuit between the group-one circuit and the group-two circuit, in accordance with some embodiments.

FIG. 10A is a layout diagram of an integrated circuit 1000 having the main circuit 50 between the group-one circuit 40 and the group-two circuit 60, in accordance with some embodiments. In FIG. 10A, the group-one circuit 40 is implemented as an inverter 1040. In an example embodiment, the group-one first-type active-region structure 82L is a p-type active-region structure and the group-one second-type active-region structure 84L is an n-type active-region structure. With the example embodiment, the gate-conductors 142 and 148 intersect the group-one first-type active-region structure 82L correspondingly at the channel region of a first PMOS transistor and the channel region of a second PMOS transistor, and the gate-conductors 142 and 148 also intersect the group-one second-type active-region structure 84L correspondingly at the channel region of a first NMOS transistor and the channel region of a second NMOS transistor. In the example embodiment, the gate-conductor 142 conductively connects the gate terminal of the first PMOS transistor with the gate terminal of the first NMOS transistor, and the gate-conductor 148 conductively connects the gate terminal of the second PMOS transistor with the gate terminal of the second NMOS transistor.

In the example embodiment, the terminal-conductor MD1 intersects the group-one first-type active-region structure 82L at the source regions of the first PMOS transistor and the second PMOS transistor, and the terminal-conductor MD3 intersects the group-one second-type active-region structure 84L at the source regions of the first NMOS transistor and the second NMOS transistor. The terminal-conductor MD1 is configured to receive a first supply voltage VDD, and the terminal-conductor MD3 is configured to receive a second supply voltage VSS. The terminal-conductor MD2 intersect the group-one first-type active-region structure 82L and the group-one second-type active-region structure 84L correspondingly at the drain regions of the first PMOS transistor and the first NMOS transistor. The terminal-conductor MD4 intersect the group-one first-type active-region structure 82L and the group-one second-type active-region structure 84L correspondingly at the drain regions of the second PMOS transistor and the second NMOS transistor. The terminal-conductor MD2 conductively connects the drain terminal of the first PMOS transistor with the drain terminal of the first NMOS transistor, and the terminal-conductor MD4 conductively connects the drain terminal of the second PMOS transistor with the drain terminal of the second NMOS transistor.

In the example embodiment, the horizontal conducting line HC1 is conductively connects to each of the gate-conductors 142 and 148 through a corresponding gate via-connector VG. The horizontal conducting line HC1 is configured as an input terminal of the inverter 1040 to receive an input logic signal. The horizontal conducting line HC2 is conductively connects to each of the terminal-conductors MD2 and MD4 through a corresponding terminal via-connector VD. The horizontal conducting line HC2 is configured as an output terminal of the inverter 1040 to generate an output logic signal.

Figure 10B:
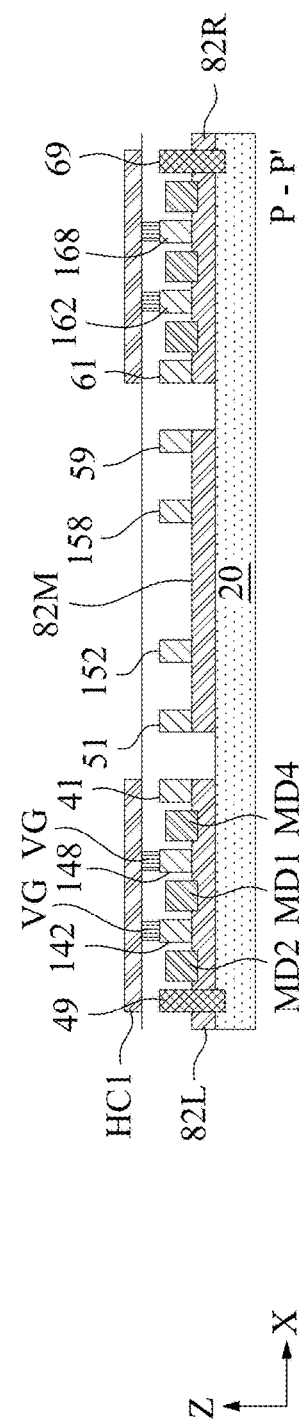
FIGS. 10B-10C are cross-sectional-views of integrated circuits in FIG. 10A, in accordance with some embodiments.
Figure 10C:
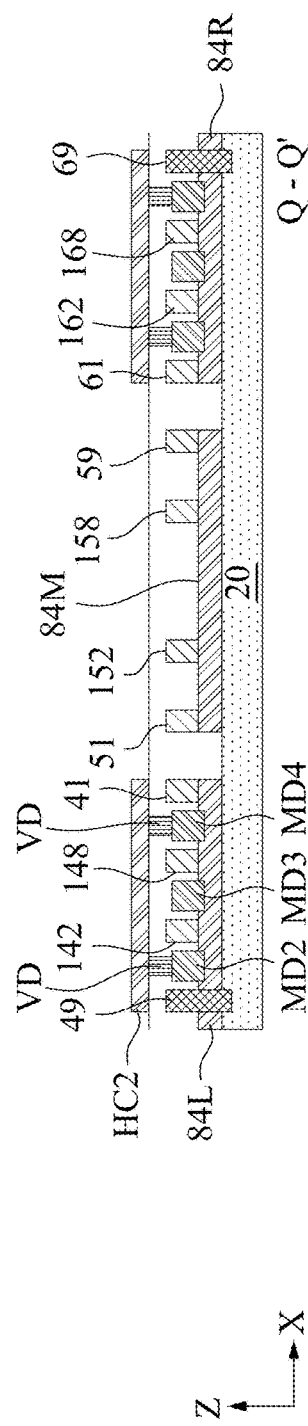

FIGS. 10B-10C are cross-sectional views of integrated circuit 1000 as specified by the layout diagram in FIG. 10A, in accordance with some embodiments. The cross-sectional view of integrated circuit 1000 in cutting the plane as specified by the line P-P' is depicted in FIG. 10B. The cross-sectional view of the inverter 1040 in the cutting plane as specified by the line Q-Q' is depicted in FIG. 10C.

In FIG. 10B, the gate-conductors 142 and 148 intersect the group-one first-type active-region structure 82L correspondingly at the channel region of the first PMOS transistor and the channel region of the second PMOS transistor. Each of the gate-conductors 142 and 148 is conductively connected to the horizontal conducting line HC1 in the first metal layer through a corresponding gate via-connector VG. The terminal-conductor MD1 intersects the group-one first-type active-region structure 82L at the source regions of the first PMOS transistor and the second PMOS transistor. The terminal-conductors MD2 and MD4 intersect the group-one first-type active-region structure 82L correspondingly at the drain region of the first PMOS transistor and the drain region of the second PMOS transistor.

In FIG. 10C, the gate-conductors 142 and 148 intersect the group-one second-type active-region structure 84L correspondingly at the channel region of the first NMOS transistor and the channel region of the second NMOS transistor. The terminal-conductor MD3 intersects the group-one second-type active-region structure 84L at the source regions of the first NMOS transistor and the second NMOS transistor. The terminal-conductors MD2 and MD4 intersect the group-one second-type active-region structure 84L correspondingly at the drain region of the first NMOS transistor and the drain region of the second NMOS transistor. Each of the terminal-conductors MD2 and MD4 is conductively connected to the horizontal conducting line HC2 in the first metal layer through a corresponding terminal via-connector VD.

In FIG. 10A, the group-two circuit 60 is implemented as an inverter 1060. The layout design of the inverter 1060 is similar to the layout design of the inverter 1040 in the group-one circuit 40. Therefore, the layout design of the inverter 1060 in the group-two circuit 60 and the connections between various elements in the inverter 1060 are not described in more details in this disclosure.

Figure 11:
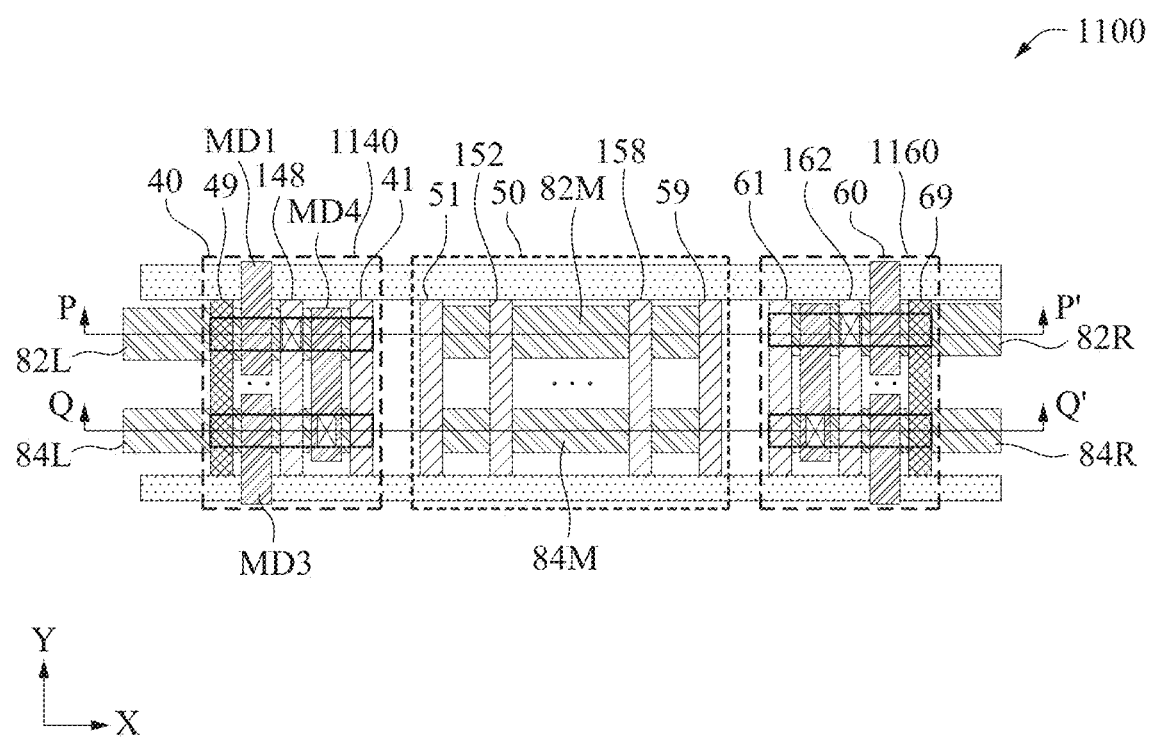
FIG. 11 is a layout diagram of an integrated circuit having the main circuit between the group-one circuit and the group-two circuit, in accordance with some embodiments.

In FIG. 10A, each of the group-one circuit 40 and the group-two circuit 60 has two PMOS transistors and two NMOS transistors. In FIG. 10A, the width of the group-one circuit 40 is three CPP, and the width of the group-two circuit 60 is also three CPP. In some alternative embodiments, such as in the integrated circuit 1100 of FIG. 11, the group-one circuit 40 is implemented as an inverter 1140, and the group-two circuit 60 is implemented as an inverter 1160. Each of the inverters 1140 and 1160, however, has one PMOS transistor and one NMOS transistor. In FIG. 11, the width of the group-one circuit 40 is two CPP, and the width of the group-two circuit 60 is also two CPP.

FIG. 11 is a layout diagram of an integrated circuit 1100 having the main circuit 50 between the group-one circuit 40 and the group-two circuit 60, in accordance with some embodiments. In FIG. 11, the group-one circuit 40 and the group-two circuit 60 are correspondingly implemented as inverters 1140 and 1160. In the group-one circuit 40, the gate-conductor 148 intersects the group-one first-type active-region structure 82L and the group-one second-type active-region structure 84L correspondingly at the channel region of a first-type transistor and the channel region of a second-type transistor. The terminal-conductor MD4 intersects the group-one first-type active-region structure 82L and the group-one second-type active-region structure 84L correspondingly at the drain region of the first-type transistor and the drain region of the second-type transistor. The terminal-conductor MD1 intersects the group-one first-type active-region structure 82L at the source region of the first-type transistor, and the terminal-conductor MD3 intersects the group-one second-type active-region structure 84L at the source region of the second-type transistor. The horizontal conducting line HC1 is conductively connected to the gate-conductor 148 through a gate via-connector VG. The horizontal conducting line HC2 is conductively connected to the terminal-conductor MD4 through a terminal via-connector VD. The horizontal conducting line HC1 is configured as an input terminal of the inverter 1140 to receive an input logic signal. The horizontal conducting line HC2 is configured as an output terminal of the inverter 1140 to generate an output logic signal. The layout design of the inverter 1160 is similar to the layout design of the inverter 1140 in the group-one circuit 40. Therefore, the layout design of the inverter 1160 in the group-two circuit 60 is not described in more details in this disclosure.

In each of the integrated circuit as shown in FIGS. 1A-1C, FIGS. 4A-4B, FIGS. 6A-6F, FIGS. 8A-8C, FIG. 10A, and FIG. 11, the main circuit 50 is between the group-one circuit 40 and the group-two circuit 60. When the main circuit 50 is combined with the group-one circuit 40 and the group-two circuit 60 to form a combined circuit cell, the combined circuit cell has a first vertical boundary (extending in the Y-direction) at the group-one isolation structure 49 and has a second vertical boundary (extending in the Y-direction) at the group-two isolation structure 69. When the combined circuit cell is used in a layout design generated by an auto placement and routing (APR) program, the main circuit 50 has improved timing performance, such as reduced variations/uncertainties in the time delays, as compared with some alternative implementations in which the main circuit 50 is used directly in the layout design by the auto placement and routing (APR) program.

When the main circuit 50 is used directly in a layout design by the auto placement and routing (APR) program and directly positioned in the layout dependent environment by the APR program, the time delays in the main circuit 50 depend upon the adjacent cells that occupy the same row as the main circuit 50 in the layout diagram. In contrast, when the main circuit 50 is positioned between the group-one circuit 40 and the group-two circuit 60 to form a combined circuit cell, only the combined circuit cell is directly positioned in the layout dependent environment by the APR program. The main circuit 50 in the combined circuit cell is in a controlled layout environment, and the group-one circuit 40 and the group-two circuit 60 are maintained as the abutting circuits of the main circuit 50. When the main circuit 50 is in a controlled layout environment, the variations/uncertainties of the time delays of the main circuit 50 are reduced.

Figure 13A:
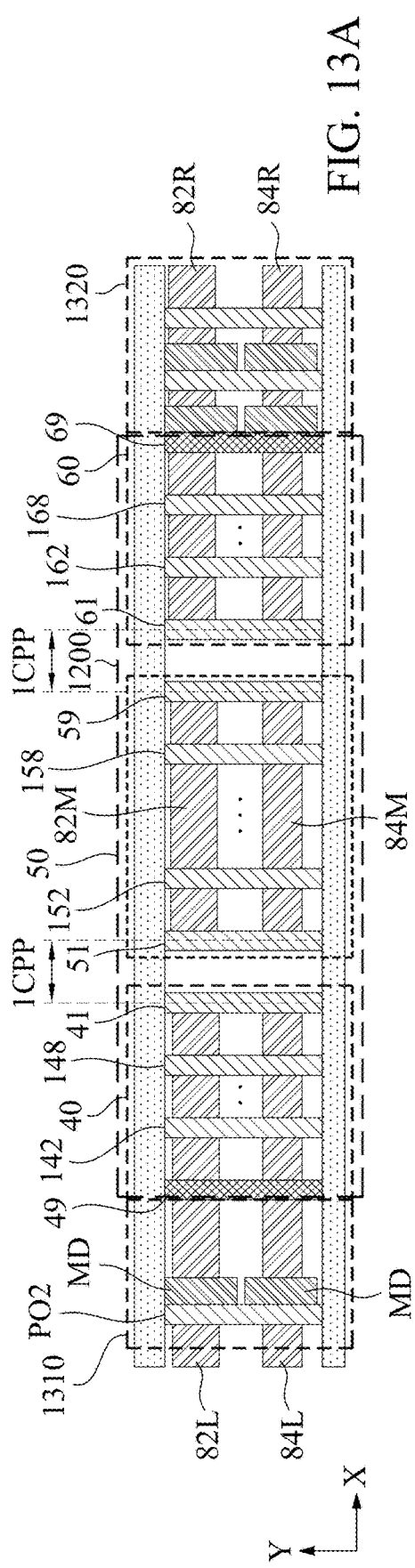
FIG. 13A is a layout diagram of a combined circuit cell and adjacent cells abutting the combined circuit cell, in accordance with some embodiments.
Figure 13B:
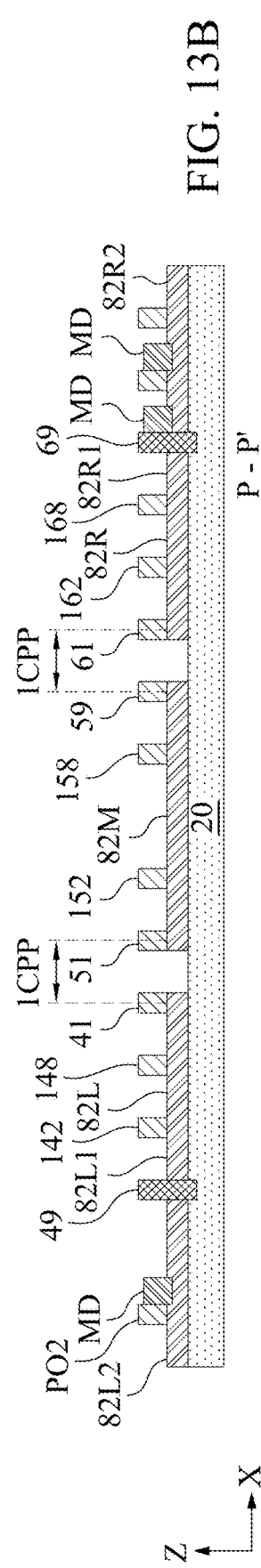
FIGS. 13B-13C are cross-sectional views of the integrated circuit in FIG. 13A, in accordance with some embodiments.
Figure 13C:
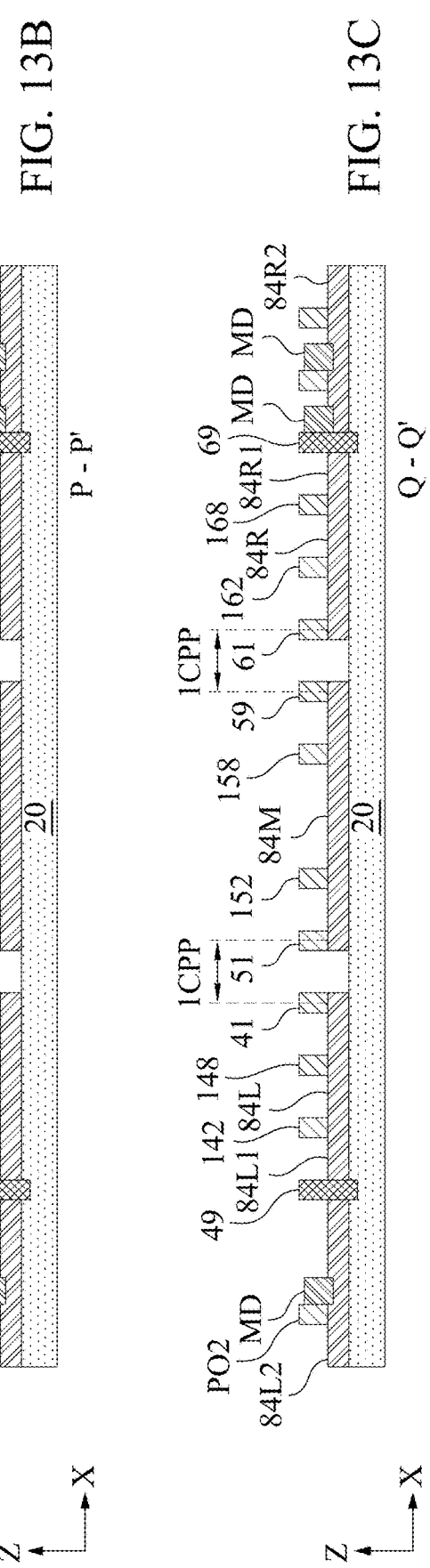

FIG. 12A and FIG. 13A are layout diagrams of a combined circuit cell 1200 and the adjacent cells abutting the combined circuit cell, in accordance with some embodiments. FIGS. 12B-12C are cross-sectional views of the integrated circuit in the cutting planes P-P' and Q-Q' as specified in FIG. 12A, in accordance with some embodiments. FIGS. 13B-13C are cross-sectional views of the integrated circuit in the cutting planes P-P' and Q-Q' as specified in FIG. 13A, in accordance with some embodiments.

In FIG. 12A and FIG. 13A, the combined circuit cell 1200 includes the main circuit 50 between the group-one circuit 40 and the group-two circuit 60. The first boundary gate-conductor 51 of the main circuit 50 is separated from the group-one boundary gate-conductor 41 of the group-one circuit 40 by a pitch distance of one CPP (as shown in FIGS. 12B-12C and FIGS. 13B-13C also). The second boundary gate-conductor 59 of the main circuit 50 is separated from the group-two boundary gate-conductor 61 of the group-two circuit 60 by a pitch distance of one CPP (as shown in FIGS. 12B-12C and FIGS. 13B-13C also).

In FIG. 12A, the combined circuit cell 1200 abuts the adjacent circuits 1210 and 1220. In FIG. 13A, the combined circuit cell 1200 abuts the adjacent circuits 1310 and 1320. In FIG. 12A and FIG. 13A, the group-one isolation structure 49 (such as a CPODE isolation structure) separates the group-one first-type active-region structure 82L into a first part 82L1 and a second part 82L2 and separates the group-one second-type active-region structure 84L into a first part 84L1 and a second part 84L2. The first part 82L1 and the first part 84L1 are in the group-one circuit 40. The second part 82L2 and the second part 84L2 are in the adjacent circuit 1210 (in FIG. 12A) or in the adjacent circuit 1310 (in FIG. 13A). Similarly, in FIG. 12A and FIG. 13A, the group-two isolation structure 69 (such as a CPODE isolation structure) separates the group-two first-type active-region structure 82R into a first part 82R1 and a second part 82R2 and separates the group-two second-type active-region structure 84R into a first part 84R1 and a second part 84R2. The first part 82R1 and the first part 84R1 are in the group-two circuit 60. The second part 82R2 and the second part 84R2 are in the adjacent circuit 1220 (in FIG. 12A) or in the adjacent circuit 1320 (in FIG. 13A).

In FIG. 12A-12C, the adjacent circuit 1210 includes gate-conductors PO1 and PO2. In FIG. 12A and FIG. 12B, gate-conductors PO1 and PO2 intersect the second part 82L2 of the group-one first-type active-region structure 82L. In FIG. 12A and FIG. 12C, gate-conductors PO1 and PO2 intersect the second part 84L2 of the group-one second-type active-region structure 84L. In FIG. 12A-12C, the adjacent circuit 1210 also include the terminal-conductors (e.g., MD) intersecting the second part 82L2 of the group-one first-type active-region structure 82L and/or the second part 84L2 of the group-one second-type active-region structure 84L.

In FIG. 13A-13C, the adjacent circuit 1310 includes a gate-conductor PO2. The gate-conductor PO2 intersects the second part 82L2 of the group-one first-type active-region structure 82L (in FIG. 13B) and intersects the second part 84L2 of the group-one second-type active-region structure 84L (in FIG. 13C). In FIG. 13A-13C, the adjacent circuit 1310 also include the terminal-conductors (e.g., MD) intersecting the second part 82L2 of the group-one first-type active-region structure 82L and/or the second part 84L2 of the group-one second-type active-region structure 84L.

In FIG. 12A-12C, the pitch distance from the group-one isolation structure 49 to the nearest gate-conductor in the adjacent circuit 1210 (which is the gate-conductor PO1) is one CPP. In FIG. 13A-13C, the pitch distance from the group-one isolation structure 49 to the nearest gate-conductor in the adjacent circuit 1310 (which is the gate-conductor PO2) is two CPPs. In some other implementations, depending upon the layout environment generated by the APR program, the pitch distance from the group-one isolation structure 49 to the nearest gate-conductor in an adjacent circuit can be larger than two CPPs (e.g., being equal to five CPPs). The pitch distance from the group-one isolation structure 49 to the nearest gate-conductor varies when the layout of the adjacent circuits 1210 or 1310 changes. Because of the group-one circuit 40 between the main circuit 50 and the adjacent circuits (e.g., 1210 or 1310), however, the variations/uncertainties of the time delays of the main circuit 50 (due to the layout changes of the adjacent circuits 1210 or 1310) are reduced, as compared to alternative implementations in which the main circuit 50 is directly abutting the adjacent circuits 1210 or 1310. Similarly, because of the group-two circuit 60 between the main circuit 50 and the adjacent circuits (e.g., 1220 or 1320), the variations/uncertainties of the time delays of the main circuit 50 (due to the layout changes of the adjacent circuits 1220 or 1320) are also reduced.

Additionally, in some embodiments, when the first boundary gate-conductor 51 of the main circuit 50 is separated from the group-one boundary gate-conductor 41 of the group-one circuit 40 by a pitch distance of one CPP, the speed performance of the main circuit 50 is improved, as compared with some alternative implementations in which the main circuit 50 and the group-one circuit 40 share a common vertical boundary at a CPODE isolation structure. In some embodiments, such as in a PODE implementation, when the first boundary gate-conductor 51 and the second boundary gate-conductor 59 of the main circuit 50 are separated correspondingly from the group-one boundary gate-conductor 41 and the group-two boundary gate-conductor 61 by a pitch distance of one CPP, the speed performance of the main circuit 50 is optimized.

Figure 14:
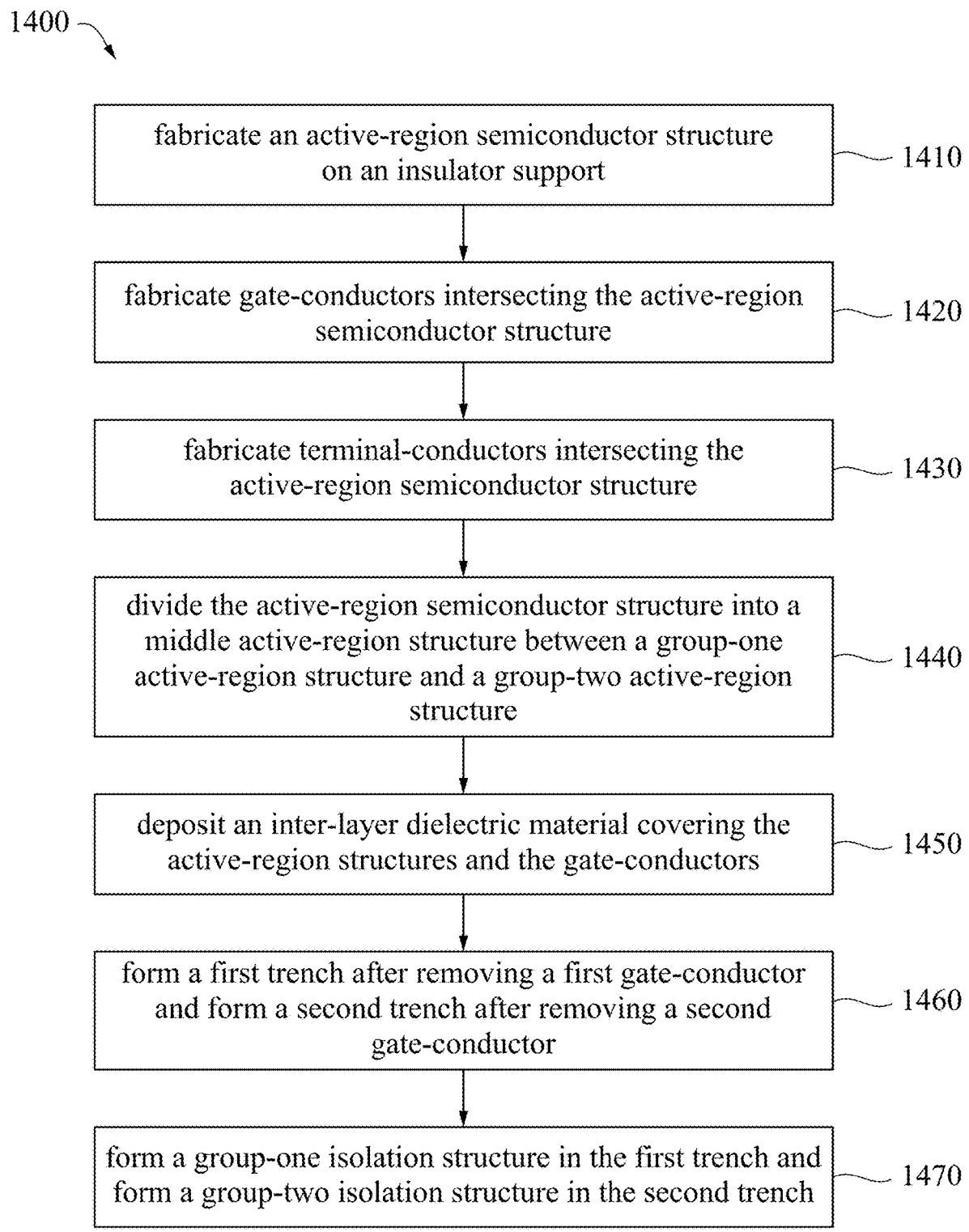
FIG. 14 is a flowchart of a method of manufacturing an integrated circuit, in accordance with some embodiments.

FIG. 14 is a flowchart of a method 1400 of manufacturing an integrated circuit, in accordance with some embodiments. It is understood that additional operations may be performed before, during, and/or after the method 1400 depicted in FIG. 14, and that some other processes may only be briefly described herein. In some embodiments, other order of operations of method 1400 is within the scope of the present disclosure. Method 1400 includes exemplary operations, but the operations are not necessarily performed in the order shown. Operations may be added, replaced, changed order, and/or eliminated as appropriate, in accordance with the spirit and scope of disclosed embodiments. FIGS. 15A-15F are cross-sectional views of an integrated circuit at various fabrication stages when the integrated circuit is fabricated with the method 1400 in FIG. 14, in accordance with some embodiments. Each of the cross-sectional views in FIGS. 15A-15F is in the same cutting plane as specified by the line P-P' in the planar view of FIG. 10B.

Figure 15A:
FIGS. 15A-15F are cross-sectional views of an integrated circuit at various fabrication stages, in accordance with some embodiments.

In operation 1410 of method 1400, an active-region semiconductor structure is fabricated on an insulator support. In some embodiments, the insulator support is a substrate. In some embodiments, the insulator support includes one or more layers of insulation materials deposited on a substrate. As a non-limiting example, in the embodiment as shown in FIG. 15A, the active-region semiconductor structure 82 is fabricated on the insulator support 20. Examples of the active-region semiconductor structure 82 include fin structures, nano-sheet structures, and nano-wire structures.

Figure 15B:
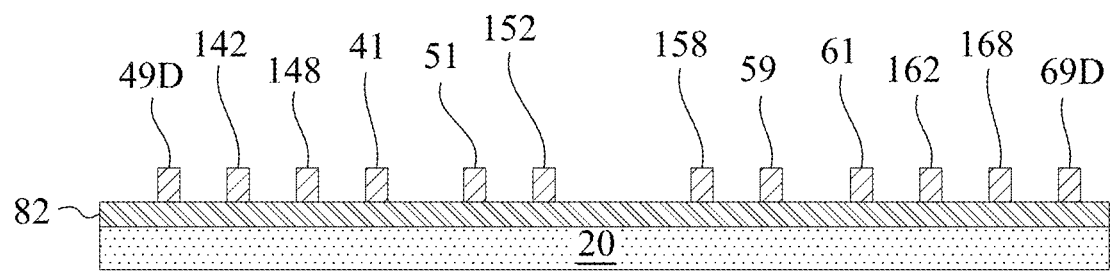

In operation 1420 of method 1400, gate-conductors intersecting the active-region semiconductor structure are fabricated. In the example embodiment as shown in FIG. 15B, the gate-conductors intersecting the active-region semiconductor structure 82 includes gate-conductors 49D, 142, 148, 41, 51, 152, 158, 59, 61, 162, 168, and 69D.

Figure 15C:
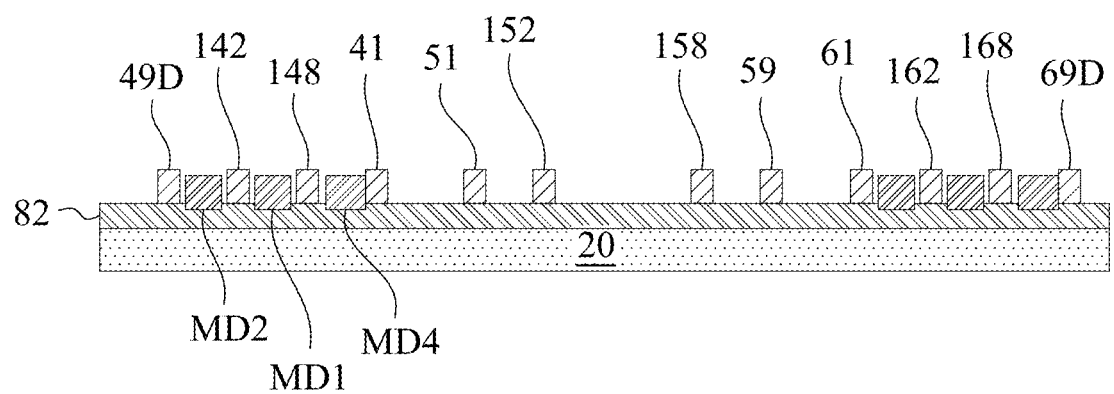

In operation 1430 of method 1400, terminal-conductors intersecting the active-region semiconductor structure are fabricated. In the example embodiment as shown in FIG. 15C, the terminal-conductors intersecting the active-region semiconductor structure 82 includes terminal-conductors MD2, MD1, and MD4.

Figure 15D:
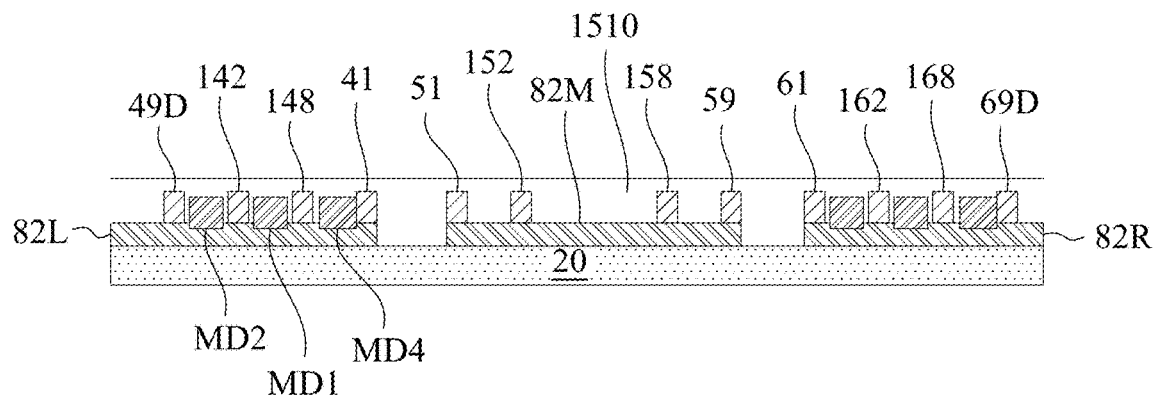

In operation 1440 of method 1400, the active-region semiconductor structure is divided into a middle active-region structure between a group-one active-region structure and a group-two active-region structure. In the example embodiment as shown in FIG. 15D, the active-region semiconductor structure 82 is divided into the middle active-region structure 82M, the group-one active-region structure 82L, and a group-two active-region structure 82R. In some embodiments, the portion of the active-region semiconductor structure 82 between the first boundary gate-conductor 51 and the group-one boundary gate-conductor 41 is removed by etching processes to separate the middle active-region structure 82M from the group-one active-region structure 82L, and the portion of the active-region semiconductor structure 82 between the second boundary gate-conductor 59 and the group-two boundary gate-conductor 61 is removed by etching processes to separate the middle active-region structure 82M from the group-two active-region structure 82R. After the etching processes, the first boundary gate-conductor 51 is positioned at a first end of the middle active-region structure 82M while the group-one boundary gate-conductor 41 is positioned at a first end of the group-one active-region structure 82L, and the second boundary gate-conductor 59 is positioned at a second end of the middle active-region structure 82M while the group-two boundary gate-conductor 61 is positioned at a first end of the group-two active-region structure 82R.

In operation 1450 of method 1400, an inter-layer dielectric material covering the active-region structures and the gate-conductors is deposited. In the example embodiment as shown in FIG. 15D, a layer of inter-layer dielectric material 1510 is deposited. The layer of inter-layer dielectric material 1510 covers the middle active-region structure 82M, the group-one active-region structure 82L, and a group-two active-region structure 82R. The layer of inter-layer dielectric material 1510 also covers various gate-conductors and various terminal-conductors.

Figure 15E:
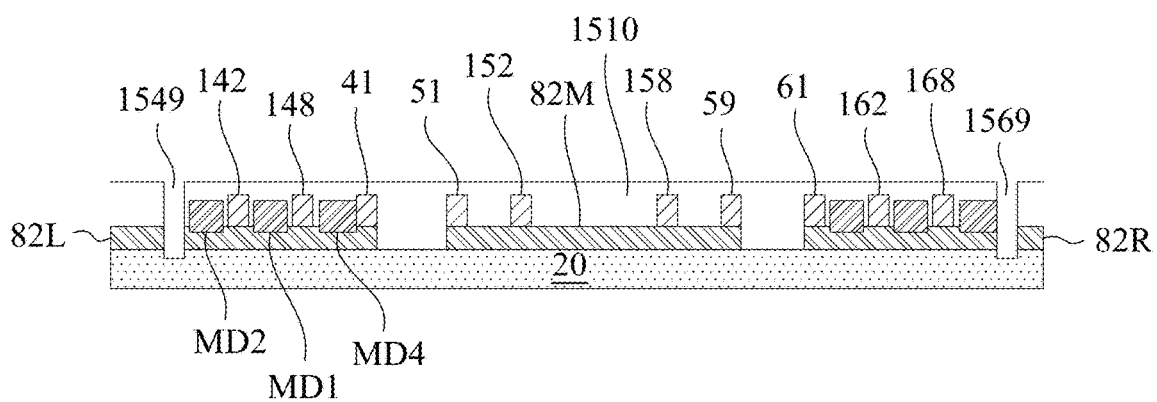

In operation 1460 of method 1400, a first trench is formed after a first gate-conductor is removed and a second trench is formed after a second gate-conductor is removed. In the example embodiment as shown in FIG. 15E, a first gate-conductor 49D in FIG. 15D is removed before forming the first trench 1549, and a second gate-conductor 69D in FIG. 15D is removed before forming the second trench 1569. In FIG. 15E, each of the first trench 1549 and the second trench 1569 extends into the insulator support 20.

Figure 15F:
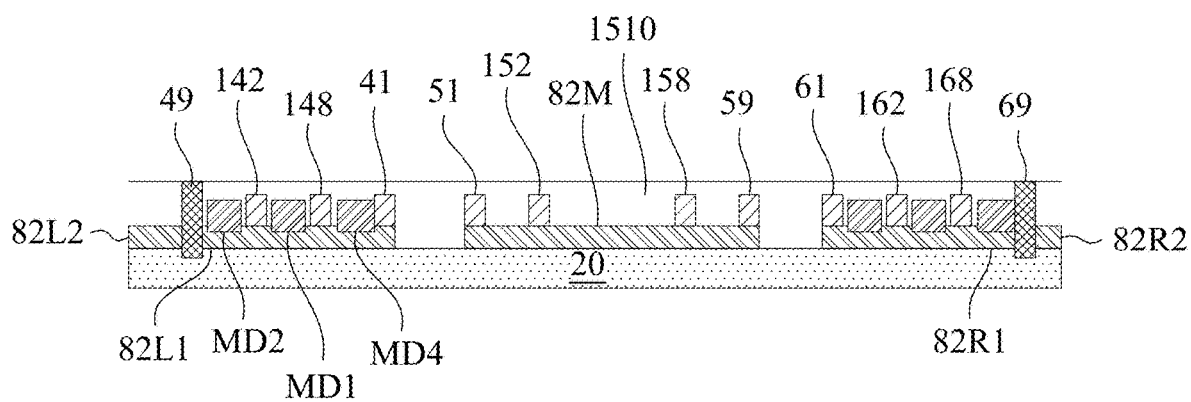

In operation 1470 of method 1400, a group-one isolation structure is formed in the first trench and a group-two isolation structure is formed in the second trench. In the example embodiment as shown in FIG. 15F, the first trench 1549 is filled with insulation materials to form the group-one isolation structure 49, and the second trench 1569 is filled with insulation materials to form the group-two isolation structure 69. In FIG. 15F, the group-one isolation structure 49 separates the group-one active-region structure 82L into a first part 82L1 and a second part 82L2, and the group-two isolation structure 69 separates the group-two active-region structure 82R into a first part 82R1 and a second part 82R2.

In some embodiments, in the operations after operation 1470, various via-connectors passing through the layer of inter-layer dielectric material 1510 are fabricated, and various routing conducting lines are fabricated atop the layer of inter-layer dielectric material 1510. In the example embodiment as shown in FIG. 10B, the via-connectors VG are fabricated for connecting gate-conductors 142 and 148 with the horizontal conducting line HC1.

Figure 16:
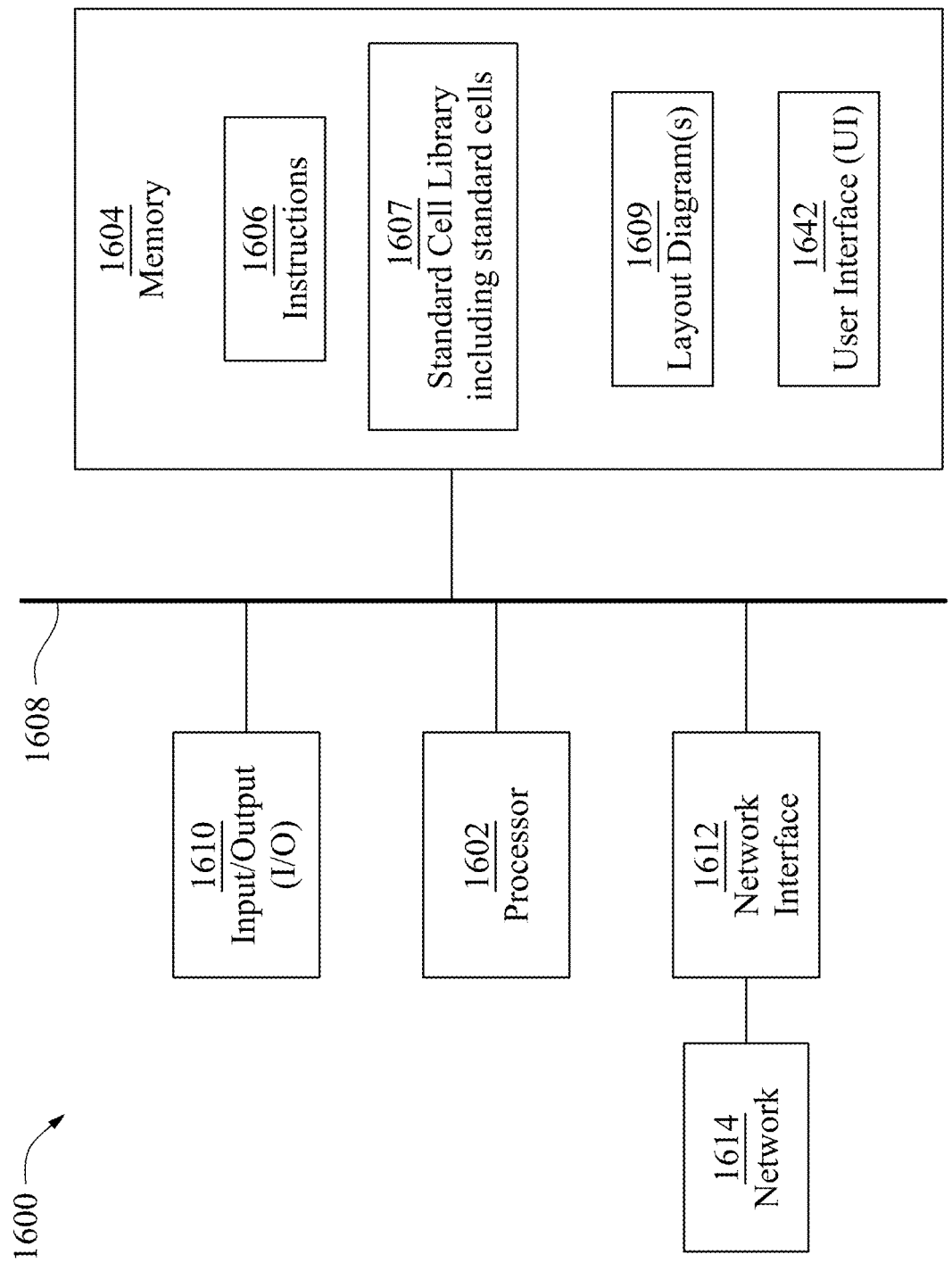
FIG. 16 is a block diagram of an electronic design automation (EDA) system in accordance with some embodiments.

FIG. 16 is a block diagram of an electronic design automation (EDA) system 1600 in accordance with some embodiments.

In some embodiments, EDA system 1600 includes an APR system. Methods described herein of designing layout diagrams represent wire routing arrangements, in accordance with one or more embodiments, are implementable, for example, using EDA system 1600, in accordance with some embodiments.

In some embodiments, EDA system 1600 is a general purpose computing device including a hardware processor 1602 and a non-transitory, computer-readable storage medium 1604. Storage medium 1604, among other things, is encoded with, i.e., stores, computer program code 1606, i.e., a set of executable instructions. Execution of instructions 1606 by hardware processor 1602 represents (at least in part) an EDA tool which implements a portion or all of the methods described herein in accordance with one or more embodiments (hereinafter, the noted processes and/or methods).

Processor 1602 is electrically coupled to computer-readable storage medium 1604 via a bus 1608. Processor 1602 is also electrically coupled to an I/O interface 1610 by bus 1608. A network interface 1612 is also electrically connected to processor 1602 via bus 1608. Network interface 1612 is connected to a network 1614, so that processor 1602 and computer-readable storage medium 1604 are capable of connecting to external elements via network 1614. Processor 1602 is configured to execute computer program code 1606 encoded in computer-readable storage medium 1604 in order to cause system 1600 to be usable for performing a portion or all of the noted processes and/or methods. In one or more embodiments, processor 1602 is a central processing unit (CPU), a multi-processor, a distributed processing system, an application specific integrated circuit (ASIC), and/or a suitable processing unit.

In one or more embodiments, computer-readable storage medium 1604 is an electronic, magnetic, optical, electromagnetic, infrared, and/or a semiconductor system (or apparatus or device). For example, computer-readable storage medium 1604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1604 includes a compact disk-read only memory (CD-ROM), a compact disk-read/write (CD-R/W), and/or a digital video disc (DVD).

In one or more embodiments, storage medium 1604 stores computer program code 1606 configured to cause system 1600 (where such execution represents (at least in part) the EDA tool) to be usable for performing a portion or all of the noted processes and/or methods. In one or more embodiments, storage medium 1604 also stores information which facilitates performing a portion or all of the noted processes and/or methods. In one or more embodiments, storage medium 1604 stores library 1607 of standard cells including such standard cells as disclosed herein. In one or more embodiments, storage medium 1604 stores one or more layout diagrams 1609 corresponding to one or more layouts disclosed herein.

EDA system 1600 includes I/O interface 1610. I/O interface 1610 is coupled to external circuitry. In one or more embodiments, I/O interface 1610 includes a keyboard, keypad, mouse, trackball, trackpad, touchscreen, and/or cursor direction keys for communicating information and commands to processor 1602.

EDA system 1600 also includes network interface 1612 coupled to processor 1602. Network interface 1612 allows system 1600 to communicate with network 1614, to which one or more other computer systems are connected. Network interface 1612 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 1600.

System 1600 is configured to receive information through I/O interface 1610. The information received through I/O interface 1610 includes one or more of instructions, data, design rules, libraries of standard cells, and/or other parameters for processing by processor 1602. The information is transferred to processor 1602 via bus 1608. EDA system 1600 is configured to receive information related to a UI through I/O interface 1610. The information is stored in computer-readable medium 1604 as user interface (UI) 1642.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 1600. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 17:
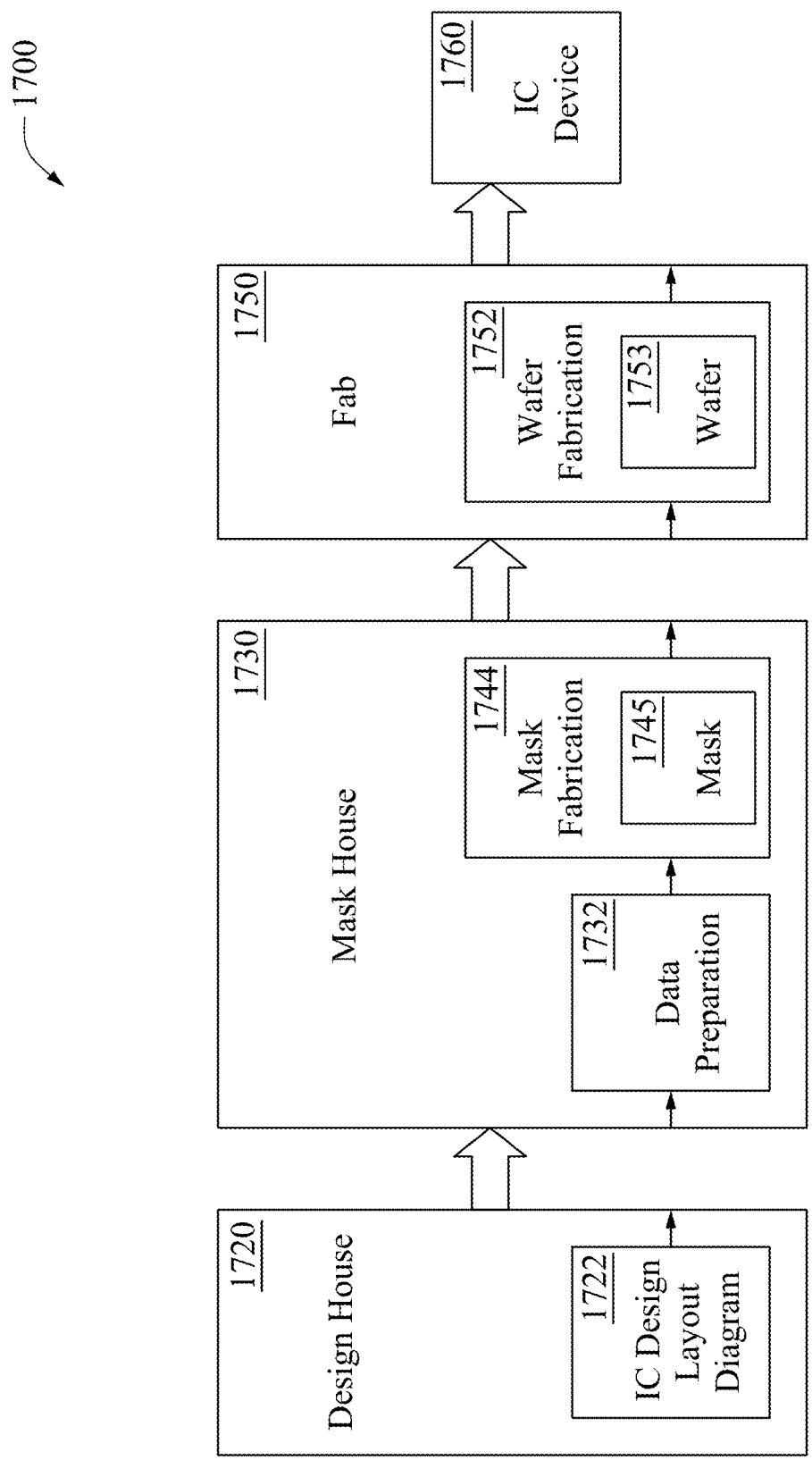
FIG. 17 is a block diagram of an integrated circuit (IC) manufacturing system, and an IC manufacturing flow associated therewith, in accordance with some embodiments.

FIG. 17 is a block diagram of an integrated circuit (IC) manufacturing system 1700, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1700.

In FIG. 17, IC manufacturing system 1700 includes entities, such as a design house 1720, a mask house 1730, and an IC manufacturer/fabricator ("fab") 1750, that interact with one another in the design, development, and manufacturing cycles and/or services related to manufacturing an IC device 1760. The entities in system 1700 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1720, mask house 1730, and IC fab 1750 is owned by a single larger company. In some embodiments, two or more of design house 1720, mask house 1730, and IC fab 1750 coexist in a common facility and use common resources.

Design house (or design team) 1720 generates an IC design layout diagram 1722. IC design layout diagram 1722 includes various geometrical patterns designed for an IC device 1760. The geometrical patterns correspond to patterns of metal, oxide, or semiconductor layers that make up the various components of IC device 1760 to be fabricated. The various layers combine to form various IC features. For example, a portion of IC design layout diagram 1722 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1720 implements a proper design procedure to form IC design layout diagram 1722. The design procedure includes one or more of logic design, physical design or place and route. IC design layout diagram 1722 is presented in one or more data files having information of the geometrical patterns. For example, IC design layout diagram 1722 can be expressed in a GDSII file format or DFII file format.

Mask house 1730 includes data preparation 1732 and mask fabrication 1744. Mask house 1730 uses IC design layout diagram 1722 to manufacture one or more masks 1745 to be used for fabricating the various layers of IC device 1760 according to IC design layout diagram 1722. Mask house 1730 performs mask data preparation 1732, where IC design layout diagram 1722 is translated into a representative data file ("RDF"). Mask data preparation 1732 provides the RDF to mask fabrication 1744. Mask fabrication 1744 includes a mask writer. A mask writer converts the RDF to an image on a substrate, such as a mask (reticle) 1745 or a semiconductor wafer 1753. The design layout diagram 1722 is manipulated by mask data preparation 1732 to comply with particular characteristics of the mask writer and/or requirements of IC fab 1750. In FIG. 17, mask data preparation 1732 and mask fabrication 1744 are illustrated as separate elements. In some embodiments, mask data preparation 1732 and mask fabrication 1744 can be collectively referred to as mask data preparation.

In some embodiments, mask data preparation 1732 includes optical proximity correction (OPC) which uses lithography enhancement techniques to compensate for image errors, such as those that can arise from diffraction, interference, other process effects and the like. OPC adjusts IC design layout diagram 1722. In some embodiments, mask data preparation 1732 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1732 includes a mask rule checker (MRC) that checks the IC design layout diagram 1722 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1722 to compensate for limitations during mask fabrication 1744, which may undo part of the modifications performed by OPC in order to meet mask creation rules.

In some embodiments, mask data preparation 1732 includes lithography process checking (LPC) that simulates processing that will be implemented by IC fab 1750 to fabricate IC device 1760. LPC simulates this processing based on IC design layout diagram 1722 to create a simulated manufactured device, such as IC device 1760. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus (DOF), mask error enhancement factor (MEEF), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1722.

It should be understood that the above description of mask data preparation 1732 has been simplified for the purposes of clarity. In some embodiments, data preparation 1732 includes additional features such as a logic operation (LOP) to modify the IC design layout diagram 1722 according to manufacturing rules. Additionally, the processes applied to IC design layout diagram 1722 during data preparation 1732 may be executed in a variety of different orders.

After mask data preparation 1732 and during mask fabrication 1744, a mask 1745 or a group of masks 1745 are fabricated based on the modified IC design layout diagram 1722. In some embodiments, mask fabrication 1744 includes performing one or more lithographic exposures based on IC design layout diagram 1722. In some embodiments, an electron-beam (e-beam) or a mechanism of multiple e-beams is used to form a pattern on a mask (photomask or reticle) 1745 based on the modified IC design layout diagram 1722. Mask 1745 can be formed in various technologies. In some embodiments, mask 1745 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1745 includes a transparent substrate (e.g., fused quartz) and an opaque material (e.g., chromium) coated in the opaque regions of the binary mask. In another example, mask 1745 is formed using a phase shift technology. In a phase shift mask (PSM) version of mask 1745, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1744 is used in a variety of processes. For example, such a mask(s) is used in an ion implantation process to form various doped regions in semiconductor wafer 1753, in an etching process to form various etching regions in semiconductor wafer 1753, and/or in other suitable processes.

IC fab 1750 is an IC fabrication business that includes one or more manufacturing facilities for the fabrication of a variety of different IC products. In some embodiments, IC Fab 1750 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1750 includes fabrication tools 1752 configured to execute various manufacturing operations on semiconductor wafer 1753 such that IC device 1760 is fabricated in accordance with the mask(s), e.g., mask 1745. In various embodiments, fabrication tools 1752 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1750 uses mask(s) 1745 fabricated by mask house 1730 to fabricate IC device 1760. Thus, IC fab 1750 at least indirectly uses IC design layout diagram 1722 to fabricate IC device 1760. In some embodiments, semiconductor wafer 1753 is fabricated by IC fab 1750 using mask(s) 1745 to form IC device 1760. In some embodiments, the IC fabrication includes performing one or more lithographic exposures based at least indirectly on IC design layout diagram 1722. Semiconductor wafer 1753 includes a silicon substrate or other proper substrate having material layers formed thereon. Semiconductor wafer 1753 further includes one or more of various doped regions, dielectric features, multi-level interconnects, and the like (formed at subsequent manufacturing steps).

Details regarding an integrated circuit (IC) manufacturing system (e.g., system 1700 of FIG. 17), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

An aspect of the present disclosure relates to an integrated circuit. The integrated circuit includes a middle active-region structure between a group-one active-region structure and a group-two active-region structure. The middle active-region structure is aligned with the group-one active-region structure and the group-two active-region structure along a first direction. The integrated circuit also includes a main circuit, a group-one circuit, and a group-two circuit. The main circuit includes a first boundary gate-conductor, a second boundary gate-conductor, and adjacent gate-conductors separated by a pitch distance equal to a contacted poly pitch ("CPP") between the first boundary gate-conductor and the second boundary gate-conductor. The first boundary gate-conductor intersects the middle active-region structure at a first end of the middle active-region structure. The second boundary gate-conductor intersects the middle active-region structure at a second end of the middle active-region structure. The group-one circuit includes a group-one boundary gate-conductor intersecting the group-one active-region structure at a first end of the group-one active-region structure, and a group-one isolation structure separating the group-one active-region structure into a first part in the group-one circuit and a second part in a first adjacent circuit. The group-one boundary gate-conductor is separated from the first boundary gate-conductor in the main circuit by a pitch distance of one CPP. A width of the group-one isolation structure along the first direction is less than one half of the CPP. The group-two circuit includes a group-two boundary gate-conductor intersecting the group-two active-region structure at a first end of the group-two active-region structure, a group-two isolation structure separating the group-two active-region structure into a first part in the group-two circuit and a second part in a second adjacent circuit. The group-two boundary gate-conductor is separated from the second boundary gate-conductor in the main circuit by a pitch distance of one CPP. A width of the group-two isolation structure along the first direction is less than one half of the CPP.

Another aspect of the present disclosure relates to a method. The method includes fabricating an active-region semiconductor structure on an insulator support, fabricating gate-conductors intersecting the active-region semiconductor structure, and fabricating terminal-conductors intersecting the active-region semiconductor structure. The method also includes dividing the active-region semiconductor structure into multiple active-region semiconductor structures that include a middle active-region structure between a group-one active-region structure and a group-two active-region structure. By dividing the active-region semiconductor structure, the method includes forming a first boundary gate-conductor at a first end of the middle active-region structure, a second boundary gate-conductor at a second end of the middle active-region structure, a group-one boundary gate-conductor at a first end of the group-one active-region structure, and a group-two boundary gate-conductor at a first end of the group-two active-region structure. The method also includes depositing an inter-layer dielectric material covering the middle active-region structure, the group-one active-region structure, the group-two active-region structure, and the gate-conductors. The method also includes forming a first trench after removing a first gate-conductor to divide the group-one active-region structure into a first part and a second part and forming a second trench after removing a second gate-conductor to divide the group-two active-region structure into a first part and a second part. The method further includes forming a group-one isolation structure in the first trench and forming a group-two isolation structure in the second trench.

Another aspect of the present disclosure still relates to an integrated circuit. The integrated circuit includes a middle first-type active-region structure between a group-one first-type active-region structure and a group-two first-type active-region structure. The middle first-type active-region structure is aligned with the group-one first-type active-region structure and the group-two first-type active-region structure along a first direction. The integrated circuit also includes a main circuit, a group-one circuit, and a group-two circuit. The main circuit includes a first boundary gate-conductor intersecting the middle first-type active-region structure at a first end of the middle first-type active-region structure, and adjacent gate-conductors separated by a pitch distance equal to a contacted poly pitch ("CPP"). The group-one circuit includes a group-one boundary gate-conductor intersecting the group-one first-type active-region structure at a first end of the group-one first-type active-region structure, and a group-one isolation structure separating the group-one first-type active-region structure into a first part in the group-one circuit and a second part in a first adjacent circuit. The group-one boundary gate-conductor is separated from the first boundary gate-conductor in the main circuit by a pitch distance of one CPP. A width of the group-one isolation structure along the first direction is less than one half of the CPP. The group-two circuit includes a group-two isolation structure separating the group-two first-type active-region structure into a first part in the group-two circuit and a second part in a second adjacent circuit. A width of the group-two isolation structure along the first direction is less than one half of the CPP.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An integrated circuit comprising:
   a middle active-region structure between a group-one active-region structure and a group-two active-region structure, wherein the middle active-region structure is aligned with the group-one active-region structure and the group-two active-region structure along a first direction;
   a main circuit comprising,
      a first boundary gate-conductor intersecting the middle active-region structure at a first end of the middle active-region structure,
      a second boundary gate-conductor intersecting the middle active-region structure at a second end of the middle active-region structure, and
      adjacent gate-conductors separated by a pitch distance equal to a contacted poly pitch ("CPP") between the first boundary gate-conductor and the second boundary gate-conductor;
   a group-one circuit comprising,
      a group-one boundary gate-conductor intersecting the group-one active-region structure at a first end of the group-one active-region structure and is separated from the first boundary gate-conductor in the main circuit by a pitch distance of one CPP, and
      a group-one isolation structure separating the group-one active-region structure into a first part in the group-one circuit and a second part in a first adjacent circuit, and wherein a width of the group-one isolation structure along the first direction is less than one half of the CPP; and
   a group-two circuit comprising,
      a group-two boundary gate-conductor intersecting the group-two active-region structure at a first end of the group-two active-region structure and is separated from the second boundary gate-conductor in the main circuit by a pitch distance of one CPP, and
      a group-two isolation structure separating the group-two active-region structure into a first part in the group-two circuit and a second part in a second adjacent circuit, and wherein a width of the group-two isolation structure along the first direction is less than one half of the CPP.

2. The integrated circuit of claim 1, wherein:
   a pitch distance between the group-one boundary gate-conductor and the group-one isolation structure is equal to or larger than two CPPs; and
   a pitch distance between the group-two boundary gate-conductor and the group-two isolation structure is equal to or larger than two CPPs.

3. The integrated circuit of claim 2, wherein each of the group-one circuit and the group-two circuit comprises:
   one or more gate-conductors intersecting either the group-one active-region structure or the group-two active-region structure.

4. The integrated circuit of claim 2, wherein each of the group-one circuit and the group-two circuit comprises:
   one or more dummy gate-conductors intersecting either the group-one active-region structure or the group-two active-region structure.

5. The integrated circuit of claim 2, wherein each of the group-one circuit and the group-two circuit comprises:
   one or more terminal-conductors intersecting either the group-one active-region structure or the group-two active-region structure.

6. The integrated circuit of claim 1, wherein:
   the first adjacent circuit has a first gate-conductor intersecting the second part of the group-one active-region structure at a first channel region of a first transistor, and wherein the first gate-conductor is separated from the group-one isolation structure by a pitch distance of one CPP; and
   the second adjacent circuit has a second gate-conductor intersecting the second part of the group-two active-region structure at a second channel region of a second transistor, and wherein the second gate-conductor is separated from the group-two isolation structure by a pitch distance of one CPP.

7. The integrated circuit of claim 6, wherein:
   the first adjacent circuit further comprises a first terminal-conductor intersecting the second part of the group-one active-region structure at a first terminal region between the group-one isolation structure and the first channel region; and
   the second adjacent circuit further comprises a second terminal-conductor intersecting the second part of the group-two active-region structure at a second terminal region between the group-two isolation structure and the second channel region.

8. A method comprising:
fabricating an active-region semiconductor structure on an insulator support;
fabricating gate-conductors intersecting the active-region semiconductor structure;
fabricating terminal-conductors intersecting the active-region semiconductor structure;
dividing the active-region semiconductor structure into multiple active-region semiconductor structures that include a middle active-region structure between a group-one active-region structure and a group-two active-region structure, whereby forming a first boundary gate-conductor at a first end of the middle active-region structure, a second boundary gate-conductor at a second end of the middle active-region structure, a group-one boundary gate-conductor at a first end of the group-one active-region structure, and a group-two boundary gate-conductor at a first end of the group-two active-region structure;
depositing an inter-layer dielectric material covering the middle active-region structure, the group-one active-region structure, the group-two active-region structure, and the gate-conductors;
forming a first trench after removing a first gate-conductor to divide the group-one active-region structure into a first part and a second part and forming a second trench after removing a second gate-conductor to divide the group-two active-region structure into a first part and a second part; and
forming a group-one isolation structure in the first trench and forming a group-two isolation structure in the second trench.

9. The method of claim 8, wherein adjacent gate-conductors are separated by a pitch distance equal to a contacted poly pitch ("CPP"), and wherein the dividing the active-region semiconductor structure comprises:
forming the first boundary gate-conductor and the group-one boundary gate-conductor which are separated by one CPP; and
forming the second boundary gate-conductor and the group-two boundary gate-conductor which are separated by one CPP.

10. The method of claim 8, wherein forming the first trench and forming the second trench comprises:
forming the first trench which extends into the insulator support; and
forming the second trench which extends into the insulator support.

11. An integrated circuit comprising:
a middle first-type active-region structure between a group-one first-type active-region structure and a group-two first-type active-region structure, wherein the middle first-type active-region structure is aligned with the group-one first-type active-region structure and the group-two first-type active-region structure along a first direction;
a main circuit comprising,
  a first boundary gate-conductor intersecting the middle first-type active-region structure at a first end of the middle first-type active-region structure, and
  adjacent gate-conductors separated by a pitch distance equal to a contacted poly pitch ("CPP");
a group-one circuit comprising,
  a group-one boundary gate-conductor intersecting the group-one first-type active-region structure at a first end of the group-one first-type active-region structure and is separated from the first boundary gate-conductor in the main circuit by a pitch distance of one CPP, and
  a group-one isolation structure separating the group-one first-type active-region structure into a first part in the group-one circuit and a second part in a first adjacent circuit, and wherein a width of the group-one isolation structure along the first direction is less than one half of the CPP; and
a group-two circuit comprising,
  a group-two isolation structure separating the group-two first-type active-region structure into a first part in the group-two circuit and a second part in a second adjacent circuit, and wherein a width of the group-two isolation structure along the first direction is less than one half of the CPP.

12. The integrated circuit of claim 11, wherein:
the main circuit further comprises a second boundary gate-conductor intersecting the middle first-type active-region structure at a second end of the middle first-type active-region structure; and
the group-two circuit further comprises a group-two boundary gate-conductor intersecting the group-two first-type active-region structure at a first end of the group-two first-type active-region structure and is separated from the second boundary gate-conductor in the main circuit by a pitch distance of one CPP.

13. The integrated circuit of claim 11, wherein:
the main circuit further comprises a boundary isolation structure terminating the middle first-type active-region structure at a second end of the middle first-type active-region structure; and
the group-two first-type active-region structure in the group-two circuit is joined with the middle first-type active-region structure in the main circuit by the boundary isolation structure.

14. The integrated circuit of claim 11, further comprising:
a middle second-type active-region structure between a group-one second-type active-region structure and a group-two second-type active-region structure, wherein the middle second-type active-region structure is aligned with the group-one second-type active-region structure and the group-two second-type active-region structure along the first direction; and
wherein the main circuit comprises a first-type transistor and a second-type transistor, the first-type transistor has a first-type channel region in the middle first-type active-region structure, and the second-type transistor has a second-type channel region in the middle second-type active-region structure.

15. The integrated circuit of claim 14, wherein the first boundary gate-conductor also intersects the middle second-type active-region structure at a first end of the middle second-type active-region structure.

16. The integrated circuit of claim 14, wherein the first boundary gate-conductor comprises a first gate-conductor segment intersecting the middle first-type active-region structure at the first end of the middle first-type active-region structure, and wherein the first boundary gate-conductor further comprises a second gate-conductor segment separated from the first gate-conductor segment, and wherein the second gate-conductor segment intersects the middle second-type active-region structure at a first end of the middle second-type active-region structure.

17. The integrated circuit of claim 14, wherein the middle second-type active-region structure is separated in the first direction with at least one of the group-one second-type active-region structure or the group-two second-type active-region structure by a distance of more than one half of the CPP.

18. The integrated circuit of claim 14, wherein the middle second-type active-region structure is joined with at least one of the group-one second-type active-region structure or the group-two second-type active-region structure to form a continuous second-type active-region structure.

19. The integrated circuit of claim 18, the main circuit further comprises a dummy gate-conductor intersecting the continuous second-type active-region structure at a boundary of the main circuit.

20. The integrated circuit of claim 19, wherein:
- the main circuit further comprises a boundary isolation structure terminating the middle first-type active-region structure at a second end of the middle first-type active-region structure, the boundary isolation structure joining the middle first-type active-region structure in the main circuit with the group-two first-type active-region structure; and
- the dummy gate-conductor at the boundary of the main circuit is aligned with the boundary isolation structure along a second direction that is perpendicular the first direction.

\* \* \* \* \*